US012764291B2

(12) United States Patent
Tian et al.

(10) Patent No.: US 12,764,291 B2
(45) Date of Patent: Oct. 13, 2026

(54) DATA ENCODING METHOD AND APPARATUS, DATA DECODING METHOD AND APPARATUS, COMPUTER DEVICE, AND STORAGE MEDIUM FOR EFFICIENT FEATURE DATA PROCESSING

(71) Applicant: TENCENT TECHNOLOGY (SHENZHEN) COMPANY LIMITED, Shenzhen (CN)

(72) Inventors: Kuan Tian, Shenzhen (CN); Jun Zhang, Shenzhen (CN); Jinxi Xiang, Shenzhen (CN); Yonghang Guan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 19/217,091

(22) Filed: May 23, 2025

(65) Prior Publication Data

US 2025/0287002 A1 Sep. 11, 2025

Related U.S. Application Data

(63) Continuation of application No. PCT/CN2023/131492, filed on Nov. 14, 2023.

(30) Foreign Application Priority Data

May 15, 2023 (CN) ......................... 202310549379.0

(51) Int. Cl.
*H04N 19/124* (2014.01)
*H04N 19/13* (2014.01)
(Continued)

(52) U.S. Cl.
CPC ........... *H04N 19/124* (2014.11); *H04N 19/13* (2014.11); *H04N 19/172* (2014.11); *H04N 19/91* (2014.11)

(58) Field of Classification Search
None
See application file for complete search history.

(56) References Cited

FOREIGN PATENT DOCUMENTS

CN 111432207 A 7/2020
CN 113613004 A * 11/2021 ........... H04N 19/172
(Continued)

OTHER PUBLICATIONS

Johannes et al., "Variational Image Compression with A Scale Hyperprior", May 1, 2018. (Year: 2018).*
(Continued)

*Primary Examiner* — James M Anderson, II
(74) *Attorney, Agent, or Firm* — Sughrue Mion, PLLC

(57) ABSTRACT

A data encoding and decoding system, method, and apparatus for efficient feature data processing. The method obtains auxiliary encoding information of feature data and determines scale parameter values corresponding to feature elements. After quantizing these values to integers, the method selects a subset of scale parameter quantization values exceeding a preset threshold. Feature elements corresponding to these selected values are extracted from the feature data and undergo entropy encoding based on their corresponding quantization values. For unencoded feature elements, the method determines appropriate replacement elements. The process combines entropy encoded elements with replacement elements to create an efficient encoded data stream, which can later be decoded through a reverse process. This selective encoding approach significantly reduces data size while maintaining essential information for accurate reconstruction.

20 Claims, 8 Drawing Sheets

(51) Int. Cl.
*H04N 19/172* (2014.01)
*H04N 19/91* (2014.01)

(56) References Cited

FOREIGN PATENT DOCUMENTS

| | | | | |
|---|---|---|---|---|
| CN | 115442609 | A | 12/2022 | |
| CN | 116979971 | A | 10/2023 | |
| EP | 4336829 | A1 * | 3/2024 | ............. H04N 19/13 |
| WO | 2011/052216 | A1 | 5/2011 | |
| WO | 2022/088631 | A1 | 5/2022 | |
| WO | WO-2022253249 | A1 * | 12/2022 | ............. H04N 19/42 |

OTHER PUBLICATIONS

Xiangji et al., "End-End Optimized video Compression with MV-Residual Prediction", Cornell University Library, May 26, 2020. (Year: 2020).*

International Search Report for PCT/CN2023/131492 dated Jan. 23, 2024.

Written Opinion for PCT/CN2023/131492 dated Jan. 23, 2024.

* cited by examiner

DATA ENCODING METHOD AND APPARATUS, DATA DECODING METHOD AND APPARATUS, COMPUTER DEVICE, AND STORAGE MEDIUM FOR EFFICIENT FEATURE DATA PROCESSING

CROSS-REFERENCE TO RELATED APPLICATIONS

This application is a continuation application of International Application No. PCT/CN2023/131492 filed on Nov. 14, 2023 which claims priority to Chinese Patent Application No. 202310549379.0 filed with the China National Intellectual Property Administration on May 15, 2023, the disclosures of each being incorporated by reference herein in their entireties.

FIELD

This disclosure relates to the field of computer technologies, a data encoding method and apparatus, a computer device, a storage medium, and a computer program product, and a data decoding method and apparatus, a computer device, a storage medium, and a computer program product.

BACKGROUND

With the development of computer technologies, data encoding and decoding have been developed to enable data compression and reconstruction. Through encoding, data can be compressed to reduce storage or transmission costs, and through decoding, the original data can be restored. These encoding and decoding techniques are widely applicable across various use cases, including cross-platform data transmission scenarios, for example, communication applications such as video and voice chats or video and voice conferencing systems.

Entropy encoding and entropy decoding are commonly employed in data compression processes. The goal of entropy encoding is to estimate and minimize the number of bits used to represent input feature data, typically by leveraging statistical models. These models analyze and represent patterns in the data to reduce redundancy and improve compression efficiency. Entropy decoding, as the inverse of entropy encoding, reconstructs the original data based on the encoded bitstream and the statistical model. However, conventional entropy encoding and decoding techniques often involve significant computational complexity, which can lead to reduced efficiency in data processing operations.

SUMMARY

Provided are data encoding and decoding methods and apparatus that efficiently process feature data through selective entropy encoding based on quantized scale parameters.

According to some embodiments, a data encoding method performed by a computer device includes: obtaining auxiliary encoding information of feature data; determining scale parameter values corresponding to feature elements based on the auxiliary encoding information; performing quantization processing on the scale parameter values to obtain scale parameter quantization values; selecting a subset of scale parameter quantization values based on a preset selecting condition, where selected values are greater than unselected values; extracting a first subset of feature elements corresponding to the selected subset; performing entropy encoding on this first subset; obtaining encoded data; and determining an encoded data stream of the feature data.

According to some embodiments, a data decoding method performed by a computer device includes: obtaining auxiliary encoding information corresponding to an encoded data stream; determining scale parameter values; performing quantization processing to obtain scale parameter quantization values; selecting a subset based on a preset condition where selected values are greater than unselected values; performing entropy decoding on the encoded data stream to obtain corresponding feature elements; determining positions of feature elements on which entropy encoding was not performed; determining replacement elements for these positions; and combining the decoded feature elements with the replacement elements to obtain restored feature data.

According to some embodiments, a data encoding and decoding apparatus includes: at least one memory configured to store computer program code; and at least one processor configured to read the program code and operate as instructed by the program code, the program code including quantization code configured to cause at least one of the at least one processor to: determine a quantization stepsize positively correlated with the difference between maximum and minimum scale parameter values and negatively correlated with a maximum quantization level; determine differences between scale parameter values and the minimum value; perform a rounding operation on the quantization stepsize based on the differences; and obtain scale parameter quantization values corresponding to scale parameter values.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

Figure 1:
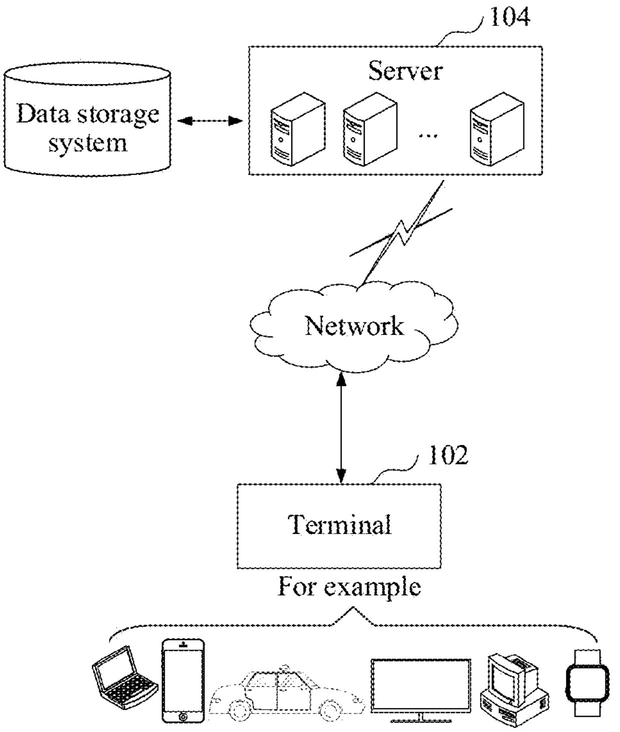
FIG. 1 is a diagram of an application environment of a data encoding method and a data decoding method according to some embodiments.

A data encoding method and a data decoding method provided in some embodiments may be applicable to an application environment shown in FIG. 1. A terminal 102 communicates with a server 104 through a network. A data storage system may be separately set up, or may be integrated on the server 104, or may be placed on a cloud or another server. The server 104 may be an independent physical server, or may be a server cluster formed by a plurality of physical servers or a distributed system, or may be a cloud server that provides a cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal 102 may be, but is not limited to, a desktop computer, a notebook computer, a smart phone, a tablet computer, an Internet of Things device, and a portable wearable device. The Internet of Things device may be a smart speaker, a smart television, a smart air condition, a smart in-vehicle device, or the like.

The data encoding method provided in some embodiments may be performed by the first device. The first device may be the server 104 or the terminal 102 shown in FIG. 1. In an encoding process, the first device may obtain auxiliary encoding information of feature data; determine, according to the auxiliary encoding information, a scale parameter value corresponding to each feature element included in the feature data; respectively perform quantization processing on each scale parameter value, to obtain a scale parameter quantization value corresponding to each scale parameter value; select some scale parameter quantization values from the scale parameter quantization values according to a preset selecting condition; extract, from a plurality of feature elements included in the feature data, a feature element corresponding to each scale parameter quantization value obtained through selection; perform, for each feature element obtained through extraction, entropy encoding on the feature element based on the scale parameter quantization value corresponding to the feature element, to obtain encoded data corresponding to the feature element; and determine an encoded data stream of the feature data according to the encoded data.

The data decoding method provided in some embodiments may be performed by a second device. The second device may be the server 104 or the terminal 102 shown in FIG. 1. In a decoding process, the second device may obtain auxiliary encoding information corresponding to an encoded data stream, the encoded data stream being obtained by encoding some feature elements of feature data according to the auxiliary encoding information. The second device further determines, according to the auxiliary encoding information, a scale parameter value corresponding to each feature element included in the feature data; respectively perform quantization processing on each scale parameter value, to obtain a scale parameter quantization value corresponding to each scale parameter value; select, from the scale parameter quantization values, some scale parameter quantization values according to a preset selecting condition, the selected scale parameter quantization value being greater than an unselected scale parameter quantization value; perform entropy decoding on the encoded data stream based on the selected scale parameter quantization value, to obtain a corresponding feature element; determine, according to the unselected scale parameter quantization value, a position of a feature element that forms the feature data and on which entropy encoding is not performed, and determine a replacement element at the position of the feature element on which entropy encoding is not performed; and combine the feature element obtained through entropy decoding and the replacement element, to obtain restored feature data.

Figure 2:
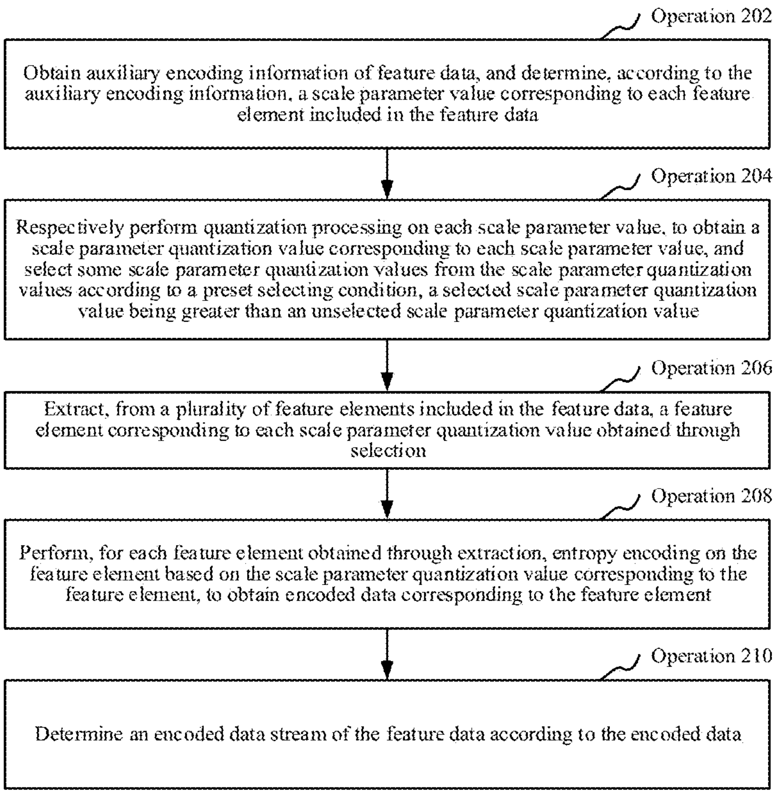
FIG. 2 is a schematic flowchart of a data encoding method according to some embodiments.

In some embodiments, as shown in FIG. 2, a data encoding method is provided. The method is performed by a first device, and the first device may be the server 104 or the terminal 102 shown in FIG. 1. In some embodiments, an example in which the method is applied to the server shown in FIG. 1 is used for description. The method includes the following operations.

Operation 202: Obtain auxiliary encoding information of feature data, and determine, according to the auxiliary encoding information, a scale parameter value corresponding to each feature element included in the feature data.

The feature data is data obtained by pre-encoding original data. The original data may be video frame data or image data. For example, an original video frame, an original image, motion estimation data of a video frame, or residual compensation data of a video frame, and corresponding feature data is a feature map; the original data may alternatively be audio data, and corresponding feature data may be an audio feature variable; and the original data may alternatively be point cloud data, and corresponding feature data may be point cloud feature data. The pre-encoding includes processing such as transformation, quantization, and inverse transformation, and may be implemented based on a mathematical manner, or may be implemented based on a deep learning neural network. The auxiliary encoding information is information configured for assisting in an encoding process, for example, side information. The side information may be feature information obtained by further encoding the feature data, for example, may be feature information obtained by inputting the feature data into a neural network for further extraction. A quantity of feature elements included in the side information is less than that of feature elements of the feature data. For example, using an example in which the feature data is the feature map, hyperprior encoding may be performed, by using a video encoding and decoding model, on the feature map for reducing a feature dimension, to obtain auxiliary encoding information of the feature map. Further, the auxiliary encoding information may be inputted into an entropy model in the video encoding and decoding model, and a scale parameter value and a position parameter value that correspond to each feature element included in the feature data are outputted by using the entropy model. The video encoding and decoding model may include a variational autoencoder (VAE) model, the entropy model corresponds to a prior of a VAE hidden layer representation, and the auxiliary encoding information is configured for assisting in entropy model encoding, for example, a prior of the prior, and therefore is referred to as hyperprior encoding.

The feature data includes feature elements. The feature elements are data units forming the feature data. Using an example in which the feature data is the feature map, the feature element is a pixel of the feature map, and each pixel represents one feature element.

The scale parameter value corresponding to the feature element is a probability distribution parameter value corresponding to the feature element. The probability distribution parameter value corresponding to the feature element is a related parameter value of a probability distribution function corresponding to the feature element. The probability distribution function corresponding to the feature element is a function configured for describing a probability distribution of the feature element. The probability distribution of the feature element is a distribution situation of a probability that the feature element takes a series of possible values relative to these values. In some embodiments, a probability of a value of the feature element may reflect a probability that the value appears in the feature map.

The related parameter value of the probability distribution function includes a scale parameter value and a position parameter value. The scale parameter value determines a shape, for example, a degree of flatness, of a curve describing the probability distribution function. A greater scale parameter value indicates a flatter curve of the probability distribution function. Conversely, a less scale parameter value indicates a thinner and taller curve of the probability distribution function. A horizontal coordinate of the curve of the probability distribution function is the value of the feature element, and a vertical coordinate of the curve of the probability distribution function is a probability value. Therefore, a greater scale parameter value indicates a higher degree of discretization of probability distribution. During application, the probability distribution of the feature element may be Gaussian distribution or Laplace distribution. When the probability distribution of the feature element is Gaussian distribution, a scale parameter may be a variance or a standard deviation of the probability distribution. The variance of the probability distribution may be a mean of a quadratic sum of differences between each probability value and a mean of all probability values in the probability distribution, and the standard deviation is an arithmetic square root of the variance. The position parameter value is configured for describing a central tendency position of the probability distribution. When the probability distribution of the feature element is Gaussian distribution, a position parameter may be a mean of the probability distribution of the feature element, or a mathematical expectation. In some embodiments, the position parameter value of the feature element may be used as a prediction feature value of the feature element.

The scale parameter value of the feature element may further represent a degree of deviation of the feature element relative to an overall distribution of the feature data, and the scale parameter value may be positively correlated with the degree of deviation. That is, a greater scale parameter value indicates a greater degree of deviation of the feature element relative to the overall distribution of the feature data. This is because a greater scale parameter value indicates a greater degree of discretization of the probability distribution, and a greater range of the value of the feature element indicates a greater degree of certainty of the value of the feature element. Therefore, the scale parameter value is more capable of reflecting the degree of certainty of the value of the feature element. However, in a data encoding process, there is generally more redundant information between two frames of to-be-encoded original data. The redundant information generally presents aggregation in original data. The redundant information carries a small amount of information, and can be accurately predicted in an encoding and decoding process, with high certainty. Correspondingly, a feature element corresponding to the redundant information also presents aggregation in feature data. A greater degree of deviation of a feature element relative to the overall distribution of the feature data indicates lower certainty of the feature element, for example, a greater scale parameter value of the feature element. Therefore, the degree of deviation of the feature element relative to the overall distribution of the feature data may be represented by using the scale parameter value of the feature element.

In some embodiments, the server may obtain the feature data, perform hyperprior encoding on the feature data for reducing a feature dimension, to obtain the auxiliary encoding information of the feature data, and then determine, according to the auxiliary encoding information, the scale parameter value corresponding to each feature element included in the feature data.

For example, when the to-be-encoded original data is the video frame, the data encoding method in this application may be implemented by using the video encoding and decoding model. The video encoding and decoding model includes the entropy model. The entropy model is a model configured for predicting data for an entropy encoding process. The probability distribution parameter value corresponding to each feature element in the feature map may be predicted by using the entropy model.

Operation 204: Respectively perform quantization processing on each scale parameter value, to obtain a scale parameter quantization value corresponding to each scale parameter value, and select some scale parameter quantization values from the scale parameter quantization values according to a preset selecting condition, a selected scale parameter quantization value being greater than an unselected scale parameter quantization value.

The quantization processing is a process of performing discretization on the scale parameter value. The scale parameter value determined according to the auxiliary encoding information is a floating point number. The floating point number is a value in a continuous interval, and has uncertainty in different computing environments. Therefore, quantization processing may be performed on the scale parameter value. For example, quantization processing may be a process of representing the scale parameter value by using an integer. The preset selecting condition is a condition that may be configured for selecting a larger value from the scale parameter quantization values obtained through quantization processing, and may be set according to needs. In some embodiments, the preset selecting condition may be that a scale parameter quantization value is used to exceed a preset quantization threshold. In some embodiments, the preset selecting condition may further be that the scale parameter quantization values are used to be ranked in the first N when sorted in ascending order. In some embodiments, the preset selecting condition may alternatively be that the scale parameter quantization value is used to be data whose value is a maximum N % in all scale parameter quantization values. The selected scale parameter quantization value is greater than the unselected scale parameter quantization value, and the scale parameter quantization value may be positively correlated with the represented degree of deviation. That is, the selected scale parameter quantization value may have a greater degree of deviation than the unselected scale parameter quantization value.

In some embodiments, the server may determine a quantization stepsize, and perform quantization processing on each scale parameter value according to the quantization stepsize, to obtain a scale parameter quantization value corresponding to each scale parameter value.

It is considered that, in the encoding process, the large amount of redundant information exists between data frames. Therefore, most feature elements are in aggregated distribution in the overall distribution of the feature data. If the degree of deviation of a feature element is small, the feature element has high certainty and is probably redundant information. Because the redundant information can be accurately predicted in the encoding process, encoding and decoding of this element may be skipped in the encoding process, thereby greatly accelerating entropy encoding and entropy decoding stages without affecting encoding and decoding quality, and improving encoding and decoding efficiency. The scale parameter quantization value is obtained by performing quantization processing on the scale parameter value, and may also represent the degree of certainty of the feature element. Therefore, the server may select some scale parameter quantization values with large values from the scale parameter quantization values according to the preset selecting condition, so as to expect, in the entropy encoding process, to select a feature element corresponding to non-redundant information for entropy encoding according to the scale parameter quantization values, and skip entropy encoding for the feature element of the redundant information.

In some embodiments, when the feature data is obtained by pre-encoding motion compensation data, the server may further perform secondary selection on unselected scale parameter quantization values. In the secondary selection, the server may further obtain motion estimation data of a data frame to which the feature data belongs, determine, according to the motion estimation data, a motion estimation value matching a position of a feature element corresponding to each scale parameter quantization value in the unselected scale parameter quantization values, and further select, from the unselected scale parameter quantization values, a scale parameter quantization value whose matching motion estimation value is greater than a motion estimation threshold.

In some embodiments, each scale parameter value is a floating point number, and each scale parameter quantization value is an integer. The first device maps a continuous floating point number to a discrete integer in a quantization process, so that when performing quantization in a same manner, the second device may obtain a same scale parameter quantization value. The second device may further obtain the scale parameter quantization value by selecting in a same selecting manner as that of the first device, so that the first device and the second device may perform entropy encoding and entropy decoding on a same feature element, thereby avoiding a situation in which calculation results of the scale parameter value are inconsistent across devices when in an encoding process and a decoding process, resulting in inaccurate reconstructed data obtained through decoding.

Operation 206: Extract, from a plurality of feature elements included in the feature data, a feature element corresponding to each scale parameter quantization value obtained through selection.

A correspondence between the scale parameter quantization value and the feature element is a position correspondence. Using an example in which the feature data is the feature map, a scale parameter quantization value obtained by performing quantization on a scale parameter value determined for the feature data may be a map having a same dimension as the feature map. Therefore, for each scale parameter quantization value in the map having the same dimension, a feature element at a same position in the feature map is a feature element corresponding to the scale parameter quantization value.

In some embodiments, the server may extract, from the plurality of feature elements included in the feature data, a feature element corresponding to each scale parameter quantization value obtained through selection. Because there are only some selected scale parameter quantization values, the selected feature elements also include only some feature elements of the feature data. In a next entropy encoding process, the server performs entropy encoding on only the selected feature elements, and skips entropy encoding on the unselected feature elements.

Operation 208: Perform, for each feature element obtained through extraction, entropy encoding on the feature element based on the scale parameter quantization value corresponding to the feature element, to obtain encoded data corresponding to the feature element.

In some embodiments, because quantization processing is performed on the original scale parameter value, when performing entropy encoding, for each selected feature element, the server may re-determine a scale parameter value of the feature element based on a scale parameter quantization value corresponding to the selected feature element, and may determine a probability distribution function for entropy encoding according to the re-determined scale parameter value, so that the feature map may be compressed into a byte stream as few as possible by using the probability distribution function. The entropy encoding may be implemented by using arithmetic coding or range coding. The arithmetic coding is used as an example, after a probability distribution function for the arithmetic coding is obtained, a probability value of each feature element in the feature map may be calculated, then the feature elements are read in one by one. Each time a feature element is read in, a range of the feature map on [0, 1] is reduced to a latest obtained interval according to a ratio, a value of the ratio is determined by the probability value of each feature element, and then iteration is performed in sequence until all feature elements are completely read, and any decimal in the obtained interval is outputted in a binary form to obtain the encoded data stream. In some embodiments, during application, re-determining the scale parameter value according to the scale parameter quantization value may be implemented by using formula (1), where $scale_{QS}$ is a quantization stepsize, $scale_{max}$ is a maximum value of a scale parameter value, and may be 64.0, $scale_{min}$ is a minimum value of a scale parameter value, and may be 0.11, L is a maximum quantization level, and may be 256, index is a scale parameter quantization value, and in a value range of 0 to 255, and scale_q represents a re-determined scale parameter value.

$$scale\_q = \exp(\log(scale_{min}) + scale_{QS} \times index) \quad \text{Formula (1)}$$

In some embodiments, the server may further construct a mapping relationship between a scale parameter quantization value index and scale_q by using the foregoing formula (1), to construct a probability distribution function lookup table, for example: index=0 corresponds to scale_q=0.1100 and index=1 corresponds to scale_q=0.1128. Therefore, after the scale parameter quantization value is selected, the scale parameter value scale_q may be directly searched in a mapping relationship table, thereby improving arithmetic coding efficiency.

In some embodiments, after obtaining the scale parameter value scale_q corresponding to a feature element, the server may determine a probability distribution function for arithmetic coding according to the scale parameter value scale_q corresponding to the feature element and the position parameter, to determine that a probability value of the feature element may be a probability value calculated by substituting a value of the feature element into the probability distribution function. Further, in some embodiments, the server may subtract a corresponding position parameter value from a value at each feature element position in a feature map y, and a subtracted feature map y_0 may be considered as a mean distribution of 0, so that the server may search a pre-established probability value lookup table according to the value of each feature element in the feature map y_0 with the mean distribution of 0, to obtain a probability value. The pre-established probability value lookup table is established in the following manner: Under a probability distribution function determined by each scale parameter value scale_q and the mean 0, a probability value of each possible value of the feature element is calculated, and a correspondence between the possible value of the feature element and the calculated probability value under each probability distribution function is established. Operation 210: Determine an encoded data stream of the feature data according to the encoded data.

In some embodiments, the server may directly use the obtained encoded data as the encoded data stream of the feature data, or further process the encoded data and use the further processed feature data as the encoded data stream of the feature data.

During application, the server may send the encoded data stream to the second device, and the second device may decode based on the encoded data stream, to reconstruct a data frame to which the feature data belongs. In some embodiments, the server may encode the auxiliary encoding information into the encoded data stream of the feature data, and send the encoded data stream to the second device together.

In the foregoing data encoding method, the auxiliary encoding information of the feature data is obtained; the scale parameter value corresponding to each feature element included in the feature data is determined according to the auxiliary encoding information; quantization processing is respectively performed on each scale parameter value; some scale parameter quantization values are selected from the scale parameter quantization values obtained through quantization processing according to the preset selecting condition, the selected scale parameter quantization value being greater than the unselected scale parameter quantization value; the feature element corresponding to each scale parameter quantization value obtained through selection is extracted from the plurality of feature elements included in the feature data; and for each feature element obtained through extraction, entropy encoding is performed on the feature element based on the scale parameter quantization value corresponding to the feature element, to obtain the encoded data corresponding to the feature element, so that the encoded data stream of the feature data can be determined according to the encoded data. In the entropy encoding process, the scale parameter quantization value may be selected according to the preset selecting condition, the feature element is selected according to a selected scale parameter quantization value, entropy encoding is performed on only the selected feature element, and the entropy encoding process of the unselected feature element is skipped. Therefore, the quantity of feature elements on which entropy encoding may be performed can be significantly reduced, thereby greatly reducing complexity of entropy encoding, and significantly improving data encoding efficiency.

In some embodiments, the selecting some scale parameter quantization values from the scale parameter quantization values according to a preset selecting condition includes: respectively comparing each scale parameter quantization value obtained through quantization processing with the preset quantization threshold, to obtain a comparison result corresponding to each scale parameter quantization value; and selecting, from the scale parameter quantization values, a scale parameter quantization value whose corresponding comparison result indicates that the scale parameter quantization value exceeds the preset quantization threshold, to obtain some scale parameter quantization values.

In some embodiments, the preset selecting condition is that the scale parameter quantization value is used to exceed the preset quantization threshold. The preset quantization threshold may be set and adjusted according to needs. A greater preset quantization threshold indicates more feature elements to be skipped in the entropy encoding process, a better acceleration effect in the entropy encoding stage indicates more prominent improvement in encoding efficiency. Definitely, different preset quantization thresholds also have some impact on a reconstruction effect in the decoding process. Therefore, balance may be performed according to actual needs.

In some embodiments, in a process of selecting the scale parameter quantization value, the server may respectively compare each scale parameter quantization value obtained through quantization processing with the preset quantization threshold, to obtain the comparison result corresponding to each scale parameter quantization value. If a comparison result of a scale parameter quantization value indicates that the scale parameter quantization value exceeds the preset quantization threshold, the scale parameter quantization value is selected, or if a comparison result of a scale parameter quantization value indicates that the scale parameter quantization value does not exceed the preset quantization threshold, the scale parameter quantization value is filtered out. Finally, some scale parameter quantization values can be selected, and the scale parameter quantization values are greater than the unselected scale parameter quantization values.

In some embodiments, each scale parameter quantization value obtained through quantization processing is respectively compared with the preset quantization threshold, and the scale parameter quantization value whose comparison result indicates that the scale parameter quantization value exceeds the preset quantization threshold is selected from the scale parameter quantization values, so that the scale parameter quantization value may be quickly selected, thereby improving selecting efficiency and improving encoding efficiency.

In some embodiments, the extracting, from a plurality of feature elements included in the feature data, a feature element corresponding to each scale parameter quantization value obtained through selection includes: determining a motion estimation value corresponding to each scale parameter quantization value in the some scale parameter quantization values, the motion estimation value matching a position of a feature element corresponding to the corresponding scale parameter quantization value; selecting, from the some scale parameter quantization values, a scale parameter quantization value whose corresponding motion estimation value is greater than a motion estimation threshold; and extracting, from the plurality of feature elements included in the feature data, a feature element corresponding to each selected scale parameter quantization value.

In some embodiments, the feature data is a feature map corresponding to the video frame data, the motion estimation data is a motion vector map obtained by performing motion estimation, and a motion estimation value of the motion estimation data may represent an amplitude of motion between video frames. Generally, a pixel at a position with a large motion estimation value includes important information, and the pixel at the position with the large motion estimation value is generally redundant information. Based on this, in some embodiments, secondary selection may be further performed on some scale parameter quantization values obtained through selection based on the motion estimation value.

In some embodiments, the vector map obtained through motion estimation is the same as an original dimension of the video frame, and feature data is equivalent to a feature map after feature extraction is performed, and is smaller than a motion estimation map in dimension. Therefore, during actual application, the vector map obtained through motion estimation generally may be reduced in dimension, to make the vector map be the same as the feature map in dimension, so that a motion estimation value matching a position of a feature element corresponding to each scale parameter quantization value in some selected scale parameter quantization values may be determined in the vector map obtained through dimension reduction. In the vector map obtained through motion estimation, each position has two values, and are respectively an x value in a horizontal direction and a y value in a vertical direction. The motion estimation value may be a statistical value of values in the two directions. For example, an x value and a y value at each position may be added, to obtain a motion estimation value of the position. Because a dimension of the vector map obtained through motion estimation is the same as that of the feature map, for each pixel in the feature map, a motion estimation value at a same position in the vector map is a motion estimation value matching the position. The server may continue to select, from some scale parameter quantization values obtained through first selection, a scale parameter quantization value whose matching motion estimation value is greater than the motion estimation threshold. Further, the server may select, from the plurality of feature elements included in the feature map, a feature element corresponding to each scale parameter quantization value obtained through secondary selection.

In a video encoding process, original data may be a video frame used as a reference frame, a vector map obtained through motion estimation, and motion compensation data. Only for entropy encoding of the motion compensation data, secondary selection can be performed by using the method provided in some embodiments.

In the foregoing embodiment, because secondary selection may be performed by using the motion estimation value in the motion estimation data, to avoid that the feature element corresponding to the redundant information is selected in a first selection process, more feature elements may be skipped in the entropy encoding process, thereby further reducing complexity of entropy encoding.

In some embodiments, the respectively performing quantization processing on each scale parameter value includes: determining a quantization stepsize, the quantization stepsize being positively correlated with a difference between a maximum value and a minimum value of the scale parameter value, and the quantization stepsize being negatively correlated with a maximum quantization level set for quantization processing; respectively determining a difference between each scale parameter value and a minimum value of the scale parameter value; and respectively performing a rounding operation on the quantization stepsize according to the difference corresponding to each scale parameter value, to obtain the scale parameter quantization value corresponding to each scale parameter value.

In some embodiments, the quantization stepsize may be calculated by using the following formula (2), where $\text{scale}_{QS}$ is a quantization stepsize.

$$\text{scale}_{QS} = \frac{\log(\text{scale}_{max}) - \log(\text{scale}_{min})}{L-1} \qquad \text{Formula (2)}$$

The scale parameter quantization value may be calculated by using the following formula (3), where index is a scale parameter quantization value, and is an integer in a value range of 0 to 255.

$$\text{index} = \left\lfloor \frac{\log(\text{scale}) - \log(\text{scale}_{min})}{\text{scale}_{QS}} \right\rceil \qquad \text{Formula (3)}$$

Formula (3) represents performing rounding, for example, near rounding on $$\frac{\log(\text{scale}) - \log(\text{scale}_{min})}{\text{scale}_{QS}}.$$

In some other embodiments, rounding up or rounding down may also be performed on $$\frac{\log(\text{scale}) - \log(\text{scale}_{min})}{\text{scale}_{QS}}.$$

Rounding up may be rounding up to a nearest integer value, rounding down may be rounding down to a nearest integer value, and near rounding may be rounding to a nearest integer value in a rounding manner. For example, a value obtained by performing rounding up on 71.97 may be 72, a value obtained by performing rounding down on 71.97 may be 71, and a value obtained by performing near rounding on 71.97 may be 72.

In some embodiments, the quantization stepsize is determined, the difference between each scale parameter value and the minimum value is respectively determined, and a rounding operation is respectively performed on the quantization stepsize according to the difference corresponding to each scale parameter value, to obtain the scale parameter quantization value corresponding to each scale parameter value, so that each scale parameter value can be quantized more accurately.

In some embodiments, the feature data is a feature map; and the data encoding method in this application further includes: determining, from the plurality of feature elements included in the feature map, a feature element corresponding to each unselected scale parameter quantization value; performing, according to a position of the feature element corresponding to each unselected scale parameter quantization value in the feature map, region division on the feature element corresponding to each unselected scale parameter quantization value, to obtain a plurality of feature element regions; selecting, for each of the plurality of feature element regions, at least one feature element located at a central position of the feature element region as a region representative element; and performing entropy encoding on a representative feature element based on a scale parameter quantization value of the representative feature element, to obtain additional encoded data of the feature data.

The region representative element is a feature element configured for representing another element in a region. There may be one or more region representative elements, and more means at least two.

In some embodiments, it is considered that redundant information between video frames generally has a certain degree of aggregation, for example, the feature element corresponding to each unselected scale parameter quantization value is aggregated in a region of the feature map. Therefore, in the encoding process, region division may be performed on the feature element corresponding to each unselected scale parameter quantization value. A division process may be specifically: dividing a feature element whose distance between feature elements is less than a preset threshold into a region; for each divided feature element region, selecting at least one feature element located at a central position of the feature element region as the region representative element; performing entropy encoding on the representative feature element based on the scale parameter quantization value of the representative feature element, to obtain the additional encoded data of the feature data. Further, the additional encoded data may be encoded into the encoded data stream of the feature data, and participate in the decoding procedure together with the encoded data stream.

In the foregoing embodiment, entropy encoding is performed on the region representative element by selecting the region representative element, so that more information can be encoded into the encoded data stream as much as possible when it is ensured that entropy encoding for some feature elements is skipped, to further ensure accuracy of an image obtained through decoding and reconstruction.

In some embodiments, the obtaining auxiliary encoding information of feature data, and determining, according to the auxiliary encoding information, a scale parameter value corresponding to each feature element included in the feature data includes: obtaining the feature data, and performing hyperprior encoding on the feature data for reducing a feature dimension, to obtain the auxiliary encoding information of the feature data; predicting, by using the auxiliary encoding information, a probability distribution parameter value of each feature element included in the feature data, to obtain the scale parameter value corresponding to each feature element.

In some embodiments, the entropy encoding process may be implemented by using an AI model. During application, the AI model herein may be a variational autoencoder (VAE) model, where the entropy model is a prior of a VAE hidden layer representation, and the auxiliary encoding information is configured for assisting in entropy model encoding, for example, a prior of the prior, and therefore is referred to as hyperprior encoding.

In some embodiments, after obtaining the feature data, the server may input the feature data into a neural network, perform hyperprior encoding for reducing a feature dimension by using the neural network, to obtain the auxiliary encoding information of the feature data, input the auxiliary encoding information as a prior parameter into the entropy model, and estimate a probability distribution of each feature element by using the entropy model. A process of estimating the probability distribution is equivalent to performing hyperprior decoding, to obtain the scale parameter value corresponding to each feature element included in the feature data and the prediction feature value corresponding to each feature element, where the scale parameter value may be a variance of the probability distribution function of the feature element, and the prediction feature value may be a mean of the probability distribution function of the feature element.

In the foregoing embodiment, the auxiliary encoding information is obtained through hyperprior encoding, and the probability distribution of each feature element is estimated by using the auxiliary encoding information to obtain the scale parameter value, so that spatial correlation of the hidden layer representation can be captured, and the obtained scale parameter value is more accurate.

In some embodiments, the feature data corresponds to a current data frame; and the method further includes: obtaining an encoded data stream of a previous data frame, and reconstructing the previous data frame based on the encoded data stream of the previous data frame; performing motion estimation on the current data frame based on the reconstructed previous data frame, to obtain motion estimation data of the current data frame; performing residual compensation estimation on the current data frame based on the motion estimation data, to obtain residual compensation data of the current data frame; and using the motion estimation data and the residual compensation data as the feature data corresponding to the current data frame.

The encoded data stream of the previous data frame is obtained by encoding the feature data of the previous data frame. Specific operations include: obtaining auxiliary encoding information of the feature data of the previous data frame, and determining, according to the auxiliary encoding information, a scale parameter value corresponding to each feature element included in the feature data; respectively performing quantization processing on each scale parameter value, and selecting, according to a preset selecting condition, some scale parameter quantization values from the scale parameter quantization values obtained through quantization processing, a selected scale parameter quantization value being greater than an unselected scale parameter quantization value; extracting, from a plurality of feature elements included in the feature data, a feature element corresponding to each scale parameter quantization value obtained through selection; performing, for each feature element obtained through extraction, entropy encoding on the feature element based on the scale parameter quantization value corresponding to the feature element, to obtain encoded data corresponding to the feature element; and determining the encoded data stream of the previous data frame based on the encoded data.

In some embodiments, when the current data frame may be encoded, the server may obtain the encoded data stream of the previous data frame, reconstruct the previous data frame based on the encoded data stream of the previous data frame, perform motion estimation on the current data frame based on the reconstructed previous data frame, to obtain motion estimation data of the current data frame, and perform residual compensation estimation on the current data frame based on the motion estimation data, to obtain residual compensation data of the current data frame, the obtained motion estimation data and residual compensation data being original data corresponding to the current data frame. The server may pre-encode the original data to obtain the feature data. After obtaining the feature data, the server may perform entropy encoding by performing the operations in the foregoing embodiment, to obtain the encoded data stream of the current data frame.

In the foregoing embodiment, the encoded data stream of the previous data frame is obtained, the previous data frame is obtained through decoding and reconstruction based on the encoded data stream of the previous data frame, and the current data frame is encoded based on the reconstructed data frame, which can effectively ensure that data decoded and reconstructed by the second device is consistent with the first device.

In some embodiments, the reconstructing the previous data frame based on the encoded data stream of the previous data frame includes: performing entropy decoding on the encoded data stream of the previous data frame based on a scale parameter quantization value selected in a process of encoding feature data of the previous data frame, to obtain a corresponding feature element; determining a replacement element at a position of a feature element that forms feature data of the previous data frame and on which entropy encoding is not performed; combining the feature element obtained through entropy decoding and the replacement element, to obtain feature data restored for the previous data frame; and performing data reconstruction based on the feature data restored for the previous data frame, to obtain a reconstructed previous data frame.

In some embodiments, in a process of encoding the previous data frame, the server may select some scale parameter quantization values, and further perform entropy encoding on only feature elements corresponding to the some scale parameter quantization values. The server may further respectively store the selected scale parameter quantization values and the unselected scale parameter quantization values. In a process of decoding and reconstructing the previous data frame, to ensure accuracy of a reconstruction result, the first device may determine, based on the scale parameter quantization value stored in the process of encoding the previous data frame, a distribution function for entropy decoding, and further perform entropy decoding based on the determined distribution function, to obtain a corresponding feature element. The obtained feature element is data for restoring the feature element encoded in the entropy encoding process. A feature element that has not been encoded in the entropy encoding process cannot be obtained through entropy decoding in the decoding process. Therefore, in the decoding process, the server may determine, according to a position corresponding to the unselected scale parameter quantization value, the replacement element at a position of the feature element that forms the feature data and on which entropy encoding is not performed, then combine the feature element obtained through entropy decoding and the replacement element, to obtain the feature data restored for the previous data frame, and finally perform data reconstruction based on the restored feature data of the previous data frame, to obtain the reconstructed previous data frame. The data reconstruction herein is an inverse process of the foregoing pre-encoding.

In the foregoing embodiment, the first device performs entropy decoding on the encoded data stream of the previous data frame by using the scale parameter quantization value selected in the process of encoding the feature data of the previous data frame, to obtain the corresponding feature element, thereby ensuring that entropy encoding and entropy decoding are performed on a same feature element in the encoding process and the decoding process, and ensuring accuracy of the decoded and reconstructed previous data frame.

Figure 3:
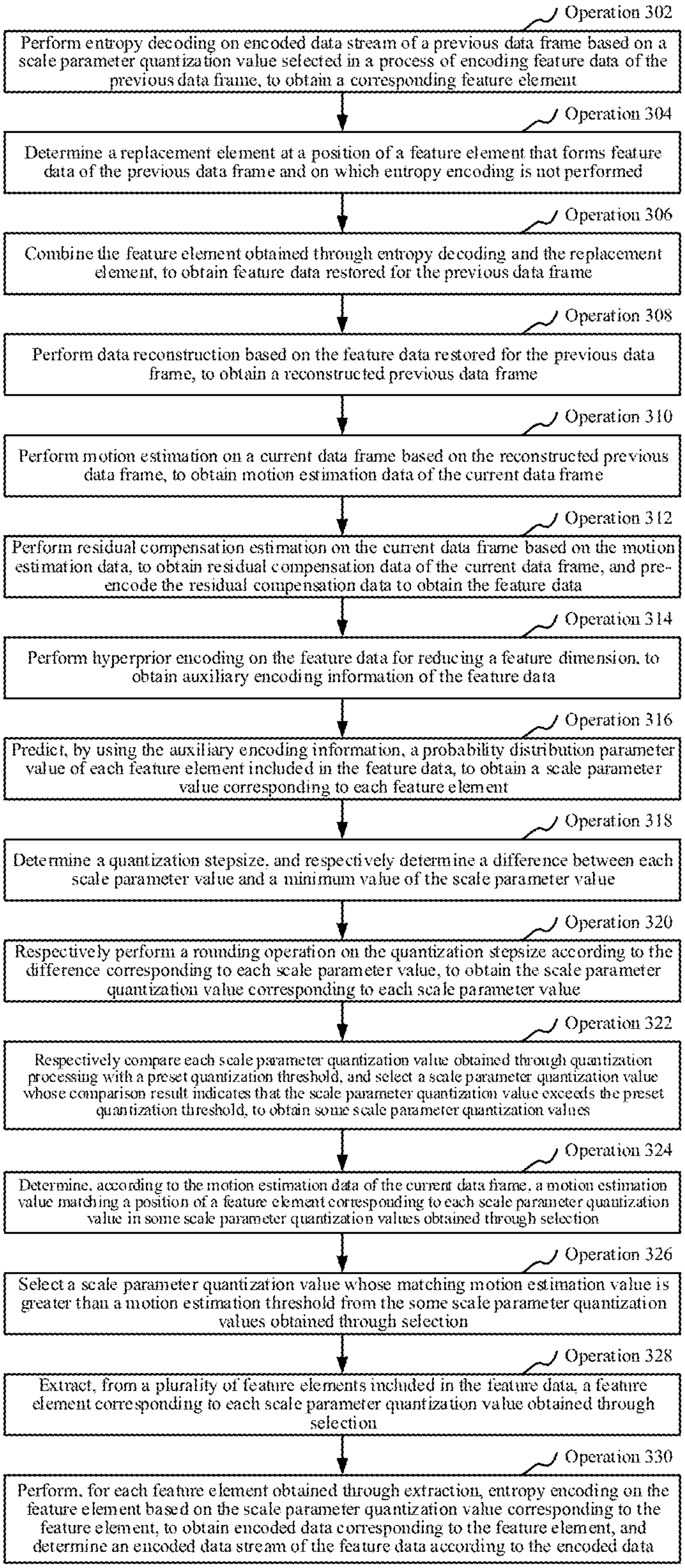
FIG. 3 is a schematic flowchart of a data encoding method according to some embodiments.

In some embodiments, as shown in FIG. 3, a data encoding method is provided. The method is performed by a first device, and the first device may be the server 104 or the terminal 102 shown in FIG. 1. In some embodiments, an example in which the method is applied to the server shown in FIG. 1 is used for description. The method includes the following operations.

Operation 302: Perform entropy decoding on an encoded data stream of a previous data frame based on a scale parameter quantization value selected in a process of encoding feature data of the previous data frame, to obtain a corresponding feature element.

Operation 304: Determine a replacement element at a position of a feature element that forms feature data of the previous data frame and on which entropy encoding is not performed.

Operation 306: Combine the feature element obtained through entropy decoding and the replacement element, to obtain feature data restored for the previous data frame.

Operation 308: Perform data reconstruction based on the feature data restored for the previous data frame, to obtain a reconstructed previous data frame.

Operation 310: Perform motion estimation on a current data frame based on the reconstructed previous data frame, to obtain motion estimation data of the current data frame.

Operation 312: Perform residual compensation estimation on the current data frame based on the motion estimation data, to obtain residual compensation data of the current data frame, and pre-encode the residual compensation data to obtain the feature data.

Operation 314: Perform hyperprior encoding on the feature data for reducing a feature dimension, to obtain auxiliary encoding information of the feature data.

Operation 316: Predict, by using the auxiliary encoding information, a probability distribution parameter value of each feature element included in the feature data, to obtain a scale parameter value corresponding to each feature element.

Operation 318: Determine a quantization stepsize, and respectively determine a difference between each scale parameter value and a minimum value of the scale parameter value.

The quantization stepsize is positively correlated with a difference between a maximum value and a minimum value of the scale parameter value, and the quantization stepsize is negatively correlated with a maximum quantization level set for quantization processing.

Operation 320: Respectively perform a rounding operation on the quantization stepsize according to the difference corresponding to each scale parameter value, to obtain a scale parameter quantization value corresponding to each scale parameter value.

Operation 322: Respectively compare each scale parameter quantization value obtained through quantization processing with a preset quantization threshold, and select a scale parameter quantization value whose comparison result indicates that the scale parameter quantization value exceeds the preset quantization threshold, to obtain some scale parameter quantization values.

Operation 324: Determine, according to the motion estimation data of the current data frame, a motion estimation value matching a position of a feature element corresponding to each scale parameter quantization value in the some scale parameter quantization values obtained through selection.

Operation 326: Select a scale parameter quantization value whose matching motion estimation value is greater than a motion estimation threshold from some scale parameter quantization values obtained through selection.

Operation 328: Extract, from a plurality of feature elements included in the feature data, a feature element corresponding to each scale parameter quantization value obtained through selection.

Operation 330: Perform, for each feature element obtained through extraction, entropy encoding on the feature element based on the scale parameter quantization value corresponding to the feature element, to obtain encoded data corresponding to the feature element, and determine an encoded data stream of the feature data according to the encoded data.

During actual application, the server also may pre-encode the motion estimation data to obtain the feature data. After obtaining the feature data corresponding to the motion estimation data, the server may further select to obtain the scale parameter quantization value through operation 314 to operation 322, and then obtain the encoded data stream through operation 328 to operation 330.

In the foregoing embodiment, in the entropy encoding process, the scale parameter quantization value may be selected according to the preset selecting condition, the feature element is selected according to a selected scale parameter quantization value, entropy encoding is performed on only the selected feature element, and the entropy encoding process of the unselected feature element is skipped. Therefore, the quantity of feature elements on which entropy encoding may be performed can be significantly reduced, thereby greatly reducing complexity of entropy encoding, and significantly improving data encoding efficiency.

Figure 4:
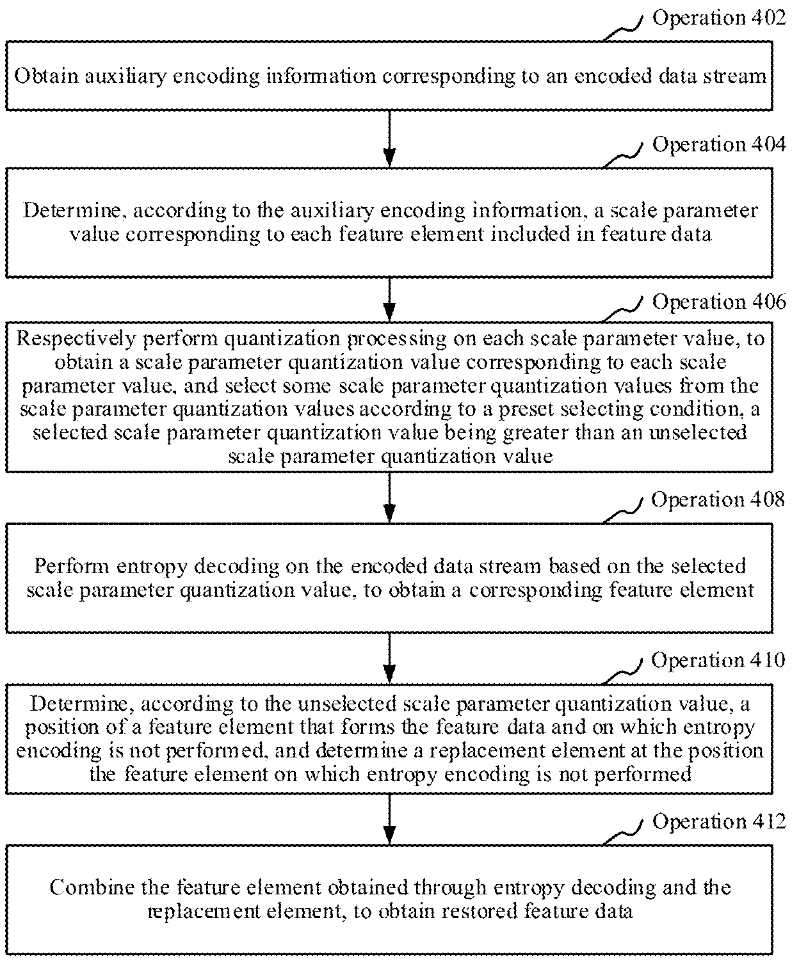
FIG. 4 is a schematic flowchart of a data decoding method according to some embodiments.

In some embodiments, as shown in FIG. 4, a data decoding method is provided. The method is performed by a second device, and the second device may be the server 104 or the terminal 102 shown in FIG. 1. In some embodiments, an example in which the method is applied to the terminal shown in FIG. 1 is used for description. The method includes the following operations.

Operation 402: Obtain auxiliary encoding information corresponding to an encoded data stream.

The auxiliary encoding information is information configured for assisting in an encoding process, for example, side information. The side information may be feature information obtained by further encoding the feature data, for example, may be feature information obtained by inputting the feature data into a neural network for further extraction. A quantity of feature elements included in the side information is less than that of feature elements of the feature data. The encoded data stream is obtained by encoding some feature elements of feature data according to the auxiliary encoding information. For a encoding process, refer to the foregoing embodiment, and details are not described herein again.

In some embodiments, the first device may encode the auxiliary encoding information into the encoded data stream in the encoding process, so that the terminal may obtain the auxiliary encoding information from the received encoded data stream after receiving the encoded data stream, and may further implement data decoding by using the auxiliary encoding information.

Operation 404: Determine, according to the auxiliary encoding information, a scale parameter value corresponding to each feature element included in feature data.

In some embodiments, the terminal may estimate, by using the auxiliary encoding information, a probability distribution parameter value of each feature element included in the feature data, to obtain a scale parameter value corresponding to each feature element, and may further obtain a prediction feature value corresponding to each feature element.

Operation 406: Respectively perform quantization processing on each scale parameter value, to obtain a scale parameter quantization value corresponding to each scale parameter value, and select some scale parameter quantization values from the scale parameter quantization values according to a preset selecting condition, a selected scale parameter quantization value being greater than an unselected scale parameter quantization value.

The quantization processing is a process of performing discretization on the scale parameter value. The scale parameter value determined according to the auxiliary encoding information is a floating point number. The floating point number is a value in a continuous interval, and has uncertainty in different computing environments. Therefore, quantization processing may be performed on the scale parameter value. The preset selecting condition may be set according to needs. In some embodiments, the preset selecting condition may be that a scale parameter quantization value is used to exceed a preset quantization threshold. In some embodiments, the preset selecting condition may further be that the scale parameter quantization values are used to be ranked in the first N when sorted in ascending order. In some embodiments, the preset selecting condition may alternatively be that the scale parameter quantization value is used to be data whose value is a maximum N % in all scale parameter quantization values.

In some embodiments, the terminal may determine a quantization stepsize, and perform quantization processing on each scale parameter value according to the quantization stepsize, to obtain a scale parameter quantization value corresponding to each scale parameter value. In the data encoding process, entropy encoding is implemented only for some feature elements by selecting the scale parameter quantization value, for example, some feature elements are skipped in the entropy encoding process. Therefore, the second device may select some scale parameter quantization values according to the same preset selecting condition as that used by the first device.

In some embodiments, the preset selecting condition is that the scale parameter quantization value is used to exceed a preset quantization threshold. The selecting, according to a preset selecting condition, some scale parameter quantization values from the scale parameter quantization values obtained through quantization processing includes: respectively comparing each scale parameter quantization value obtained through quantization processing with the preset quantization threshold, to obtain a comparison result corresponding to each scale parameter quantization value; and selecting, from the scale parameter quantization values, a scale parameter quantization value whose comparison result indicates that the scale parameter quantization value exceeds the preset quantization threshold, to obtain some scale parameter quantization values.

In some embodiments, when the feature data is obtained by pre-encoding the motion compensation data, the terminal may further perform secondary selection on unselected scale parameter quantization values. In the secondary selection, the terminal may further obtain motion estimation data of a data frame to which the feature data belongs, determine, according to the motion estimation data, a motion estimation value matching a position of a feature element corresponding to each scale parameter quantization value in the unselected scale parameter quantization values, and further select, from the unselected scale parameter quantization values, a scale parameter quantization value whose matching motion estimation value is greater than a motion estimation threshold.

In some embodiments, each scale parameter value is a floating point number, and each scale parameter quantization value is an integer. The first device maps a continuous floating point number to a discrete integer in a quantization process, so that when performing quantization in a same manner, the second device may obtain a same scale parameter quantization value. The second device may further obtain the scale parameter quantization value by selecting in a same manner as that of the first device, so that the first device and the second device may perform entropy encoding and entropy decoding on a same feature element, thereby avoiding a situation in which calculation results of the scale parameter value are inconsistent across devices when in an encoding process and a decoding process, resulting in inaccurate reconstructed data obtained through decoding.

Operation 408: Perform entropy decoding on the encoded data stream based on the selected scale parameter quantization value, to obtain a corresponding feature element.

Specifically, the terminal may re-determine the scale parameter value based on each selected scale parameter value, determine, according to the re-determined scale parameter value, the probability distribution function for arithmetic coding, and then perform entropy decoding according to the probability distribution function, to obtain the corresponding feature element.

During application, the terminal may construct a probability distribution function lookup table between a scale parameter quantization value and a scale parameter value by using the foregoing formula (1), so that the terminal may search the probability distribution function lookup table to obtain the scale parameter value cale_q after obtaining the scale parameter quantization value, and determine the probability distribution function for arithmetic coding according to cale_q.

Operation 410: Determine, according to the unselected scale parameter quantization value, a position of a feature element that forms the feature data and on which entropy encoding is not performed, and determine a replacement element at the position of the feature elements on which entropy encoding is not performed.

The scale parameter quantization values that are not selected in the entropy decoding process are also not selected in the entropy encoding. Therefore, the feature elements respectively corresponding to scale parameter values are the feature elements on which entropy encoding is not performed. In this way, in the decoding process, the terminal may determine positions respectively corresponding to the unselected scale parameter quantization values as positions of the feature elements on which entropy encoding is not performed. Since entropy encoding is not performed on the feature elements at these positions, and these feature elements cannot be restored in the entropy decoding process, in some embodiments, the terminal may further determine replacement elements at these positions.

Operation 412: Combine the feature element obtained through entropy decoding and the replacement element, to obtain restored feature data.

In some embodiments, in the decoding process, the terminal may determine, according to the position corresponding to the unselected scale parameter quantization value, the replacement element at the position of the feature element that forms the feature data and on which entropy encoding is not performed, and then combine the feature element obtained through entropy decoding and the replacement element, for example, combine the feature element and the replacement element according to positions of the feature element and the replacement element, to obtain the restored feature data. The terminal may further perform data reconstruction according to the restored feature data, to obtain a reconstructed data frame. The data reconstruction herein is an inverse process of the foregoing pre-encoding.

According to the foregoing data decoding method, the auxiliary encoding information corresponding to the encoded data stream is obtained; the scale parameter value corresponding to each feature element included in feature data is determined according to the auxiliary encoding information; quantization processing is respectively performed on each scale parameter value; some scale parameter quantization values are selected from the scale parameter quantization values obtained through quantization processing according to the preset selecting condition, the selected scale parameter quantization value being greater than the unselected scale parameter quantization value; entropy decoding is performed on the encoded data stream based on the selected scale parameter quantization value, to obtain the corresponding feature element; the replacement element at the position of the feature element that forms the feature data and on which entropy encoding is not performed is determined; and the feature element obtained through entropy decoding is combined with the replacement element, to obtain the restored feature data. In the decoding process, because a large scale parameter quantization value may be selected, entropy decoding is performed only based on the selected scale parameter quantization value, so that entropy decoding may be performed on only some feature elements, thereby greatly reducing complexity of entropy encoding and significantly improving data decoding efficiency. In addition, because a selecting process is selecting the scale parameter quantization value obtained through quantization processing according to the preset selecting condition, and the scale parameter value is discretized in the quantization processing process, so that a probability that the selected scale parameter quantization value is consistent with the scale parameter quantization value selected in the encoding process increases, thereby improving accuracy of feature data restored by decoding.

In some embodiments, the respectively performing quantization processing on each scale parameter value includes: determining a quantization stepsize, the quantization stepsize being positively correlated with a difference between a maximum value and a minimum value of the scale parameter value, and the quantization stepsize being negatively correlated with a quantization level set for quantization processing; respectively determining a difference between each scale parameter value and the minimum value; and respectively performing a rounding operation on the quantization stepsize according to the difference corresponding to each scale parameter value, to obtain the scale parameter quantization value corresponding to each scale parameter value.

It can be learned from the foregoing embodiment that, for a feature element on which entropy encoding is not performed, a replacement element may be determined. The following embodiment provides two different determining manners of the replacement element.

In some embodiments, each scale parameter quantization value obtained through quantization processing is in one-to-one correspondence with a position of each feature element in the feature data, and the auxiliary encoding information is obtained by performing hyperprior encoding on the feature data. The determining a replacement element at the position of the feature element on which entropy encoding is not performed includes: obtaining a prediction feature value corresponding to each feature element, the prediction feature value being obtained by predicting a probability distribution parameter value of a corresponding feature element by using the auxiliary encoding information; and determining, for a position of each feature element on which entropy encoding is not performed, a prediction feature value whose position matches the position from the prediction feature values, and determining a replacement element for the position of the feature element according to the determined prediction feature value.

In some embodiments, when predicting the probability distribution parameter value of each feature element by using the auxiliary encoding information, the terminal may further obtain the prediction feature value. The prediction feature value may be a mean of the probability distribution function corresponding to the feature element. Feature elements skipped in the entropy encoding process are basically feature elements corresponding to redundant information, and prediction feature values corresponding to the feature elements are generally more accurate. Therefore, in the decoding process, a feature element on which entropy encoding is not performed may be replaced with a prediction feature value obtained by predicting a probability distribution parameter value of a corresponding feature element. Based on this, after obtaining the prediction feature value, the terminal respectively selects, according to a position of each feature element on which entropy encoding is not performed, a prediction feature value whose position matches the position from each prediction feature value, and determines, according to the selected prediction feature value, the replacement element at the position of the feature element that forms the feature data and on which entropy encoding is not performed.

An example in which the feature data is the feature map is used for description. A prediction feature map may be obtained by estimating the probability distribution of each feature element by using the auxiliary encoding information. A position of each unselected scale parameter quantization value in the map is determined as the position of the feature element on which entropy encoding is not performed. Further, a prediction feature value located at a same position may be determined from the obtained prediction feature map, and the prediction feature value is used as a replacement element of the feature element at the same position in the feature map.

In the foregoing embodiment, it is considered that an element skipped in the encoding process is generally of high certainty, a prediction feature value estimated by using the probability distribution may be replaced as a true value, so that a burr phenomenon in the encoding and decoding process can be reduced.

In some embodiments, the feature data is the feature map, and each scale parameter quantization value obtained through quantization processing is in one-to-one correspondence with a position of each feature element in the feature map. The determining a replacement element at the position of the feature element on which entropy encoding is not performed includes: obtaining additional encoded data of the feature map from the encoded data stream, and performing entropy decoding on the additional encoded data, to obtain a corresponding region representative element; performing, in the feature map, region division based on a position of a feature element on which entropy encoding is not performed; and respectively determining, for each divided region, a region representative element whose position is in the region as a replacement element at a position of each feature element on which entropy encoding is not performed in the region.

In some embodiments, when encoding, the first device may further encode the additional encoded data into the encoded data stream. For a manner of determining the additional encoded data, refer to the foregoing embodiment, and details are not described herein again. Therefore, in the decoding process, the terminal may obtain the additional encoded data of the feature map from the encoded data stream, and perform entropy decoding on the additional encoded data, to obtain a corresponding region representative element. It is considered that that in the encoding process, the selected feature element on which entropy encoding is performed is a feature element corresponding to the selected scale parameter quantization value, and the feature element on which entropy encoding is not performed is a feature element corresponding to the unselected scale parameter quantization value. Therefore, a position corresponding to each unselected scale parameter quantization value is determined as a position of the feature element on which entropy encoding is not performed, and in the feature map, region division is performed on the position of the feature element on which entropy encoding is not performed in a manner the same as the encoding process. For each divided region, a region representative element whose position is in the region is respectively determined as a replacement element at the position of each feature element on which entropy encoding is not performed in the region.

In the foregoing embodiment, the position of the feature element on which entropy encoding is not performed is determined, and region division is performed based on the position of the feature element on which entropy encoding is not performed. For each position of the feature element on which entropy encoding is not performed in each divided region, the region representative element whose position is in the region is used as the replacement element at the position, so that a more accurate replacement element can be determined.

Figure 5:
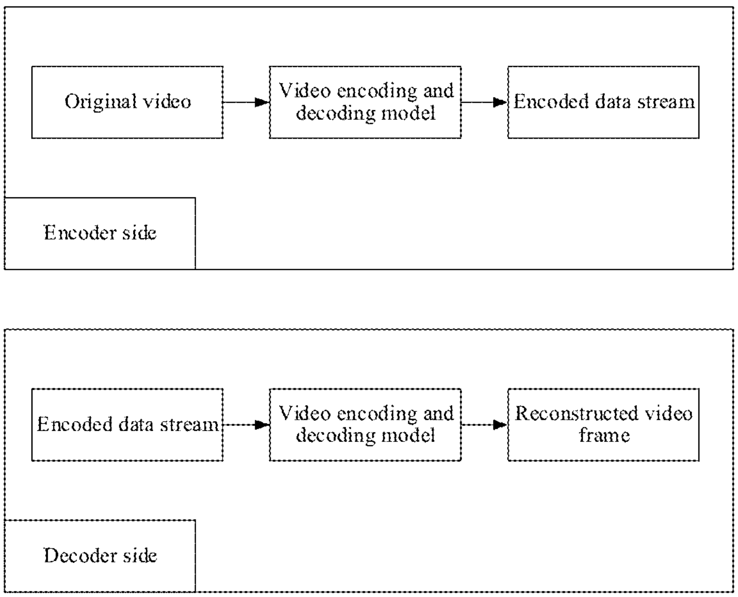
FIG. 5 is a schematic diagram of an overall process of video encoding and decoding according to some embodiments.

In some embodiments, this application further provides an application scenario. In the application scenario, the data encoding method and the data decoding method may be configured for encoding and decoding a video. A video application may be installed on a terminal, and the terminal may play the video by using the video application. Referring to FIG. 5, the server may be used as an encoder side to perform data encoding on each video frame in an original video to obtain an encoded data stream and then send the encoded data stream to a terminal. The terminal may be used as a decoder side to decode the encoded data stream to obtain a reconstructed video frame, so as to play a video based on the reconstructed video frame.

Continue to refer to FIG. 5. In some embodiments, encoding on the encoder side and decoding on the decoder side are both implemented based on a video encoding model, and the video encoding model is an AI model. An encoding and decoding process of a video encoding and decoding model mainly includes two stages, which are respectively I-frame encoding and decoding (intra-frame encoding) and P-frame encoding and decoding (inter-frame encoding). Generally, I-frame encoding and decoding is implemented by using an AI image encoding and decoding algorithm. A P-frame encoding and decoding model may be designed for characteristics of inter-frame encoding, and is generally divided into two modules: motion estimation and residual compensation. A core idea of these models is to convert an original image into some feature maps that need to be transmitted, and reduce an amount of bytes transmitted by the feature map by using an entropy encoding module, thereby greatly reducing a byte size of video transmission.

In an encoding stage, for an I-frame model, the original image is converted into a to-be-transmitted feature map for transmission, while for a P-frame model, the original image is generally converted into a feature map of motion estimation and a feature map of residual compensation for transmission. In a decoding stage, after receiving the feature map, the I frame model reconstructs an I-frame image. The P-frame model receives the feature map of motion estimation to reconstruct motion estimation, acts on the reference I-frame reconstructed image to obtain a P-frame intermediate result of motion estimation, and finally reconstructs residual compensation information by using the feature map of residual compensation, and acts on the P-frame intermediate result, to obtain a P-frame reconstructed image.

For how to transmit feature maps, entropy encoding estimation is generally used in AI video encoding and decoding technologies for implementation. Entropy encoding is a common data compression technology, and is also a very important part of video encoding and decoding technologies. In video encoding, entropy encoding is generally used to compress residual data, a motion vector, and other encoding parameters in a video encoder, to reduce storage space and transmission bandwidth of video data.

An entropy encoding estimation module is a key module in the AI video encoding and decoding, and an objective of the entropy encoding estimation module is to estimate, according to inputted encoded data, a quantity of bits for entropy encoding of the inputted encoded data. This module is generally implemented based on a statistical model, and analyzes and models encoded data, to reduce a quantity of bits as much as possible in the entropy encoding process. Commonly used entropy encoding algorithms include Huffman encoding, arithmetic coding, and the like. The arithmetic coding is used as an example, in the entropy encoding process, arithmetic coding calculation may be performed on each feature element (which may be understood as each value in a feature map). To improve reconstruction quality at the decoder side, the feature map generally includes a large quantity of feature elements, and serial element-by-element encoding by using arithmetic coding may consume a large amount of time.

According to the data encoding method and the data decoding method provided in some embodiments, arithmetic coding acceleration can be implemented. According to the data encoding method and the data decoding method provided in some embodiments, a scale value (for example, a scale parameter value) estimated by entropy encoding is converted into an index (for example, a scale parameter quantization value), so that the index value may reflect the degree of certainty of the position. For a value with a low index value, the certainty is very high, and can be skipped, thereby reducing a quantity of elements truly encoded. For example, 10,000 elements need to be encoded in original arithmetic coding, and only 2,000 elements with a large index value need to be encoded by using a skip policy, a time consumption of the arithmetic coding is reduced by ⅘, thereby greatly improving a speed of the arithmetic coding. In the decoding process, a value estimated by an entropy encoding model may be used as a true value of a skipped element, thereby effectively reducing a burr phenomenon in the encoding and decoding process. Specific introduction is made below.

Figure 6:
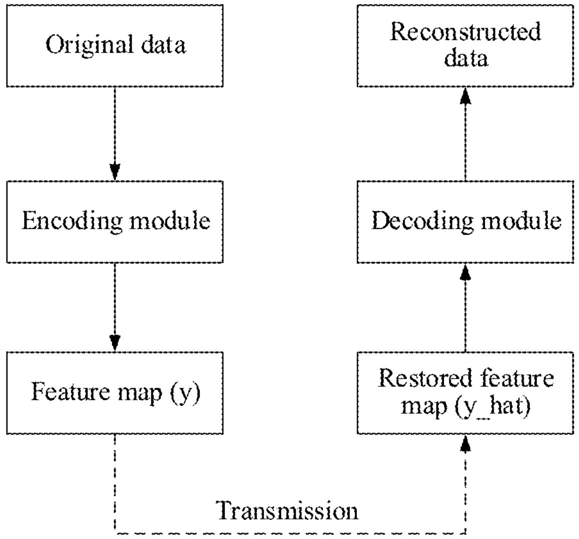
FIG. 6 is a framework diagram of an encoding and decoding model according to some embodiments.

Referring to FIG. 6, for original data (which may be an image, motion estimation, residual estimation, or the like), after an encoding module, first-stage compression may be performed on the original data, to obtain a feature map. The decoder side obtains the restored feature map, and the reconstructed data can be obtained through the decoding module.

Figure 7:
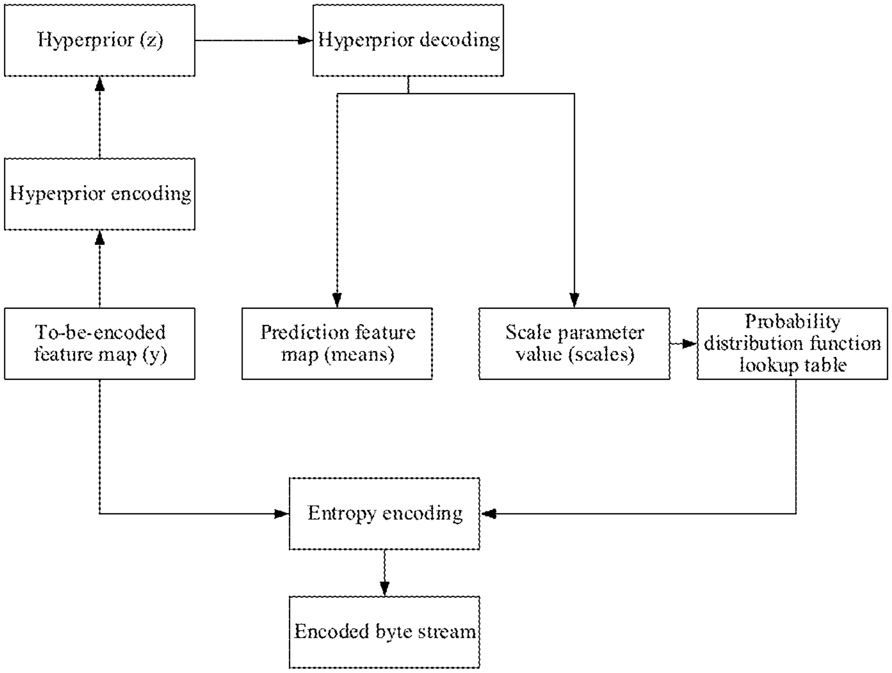
FIG. 7 is a schematic flowchart of an entropy encoding module according to some embodiments.
Figure 8:
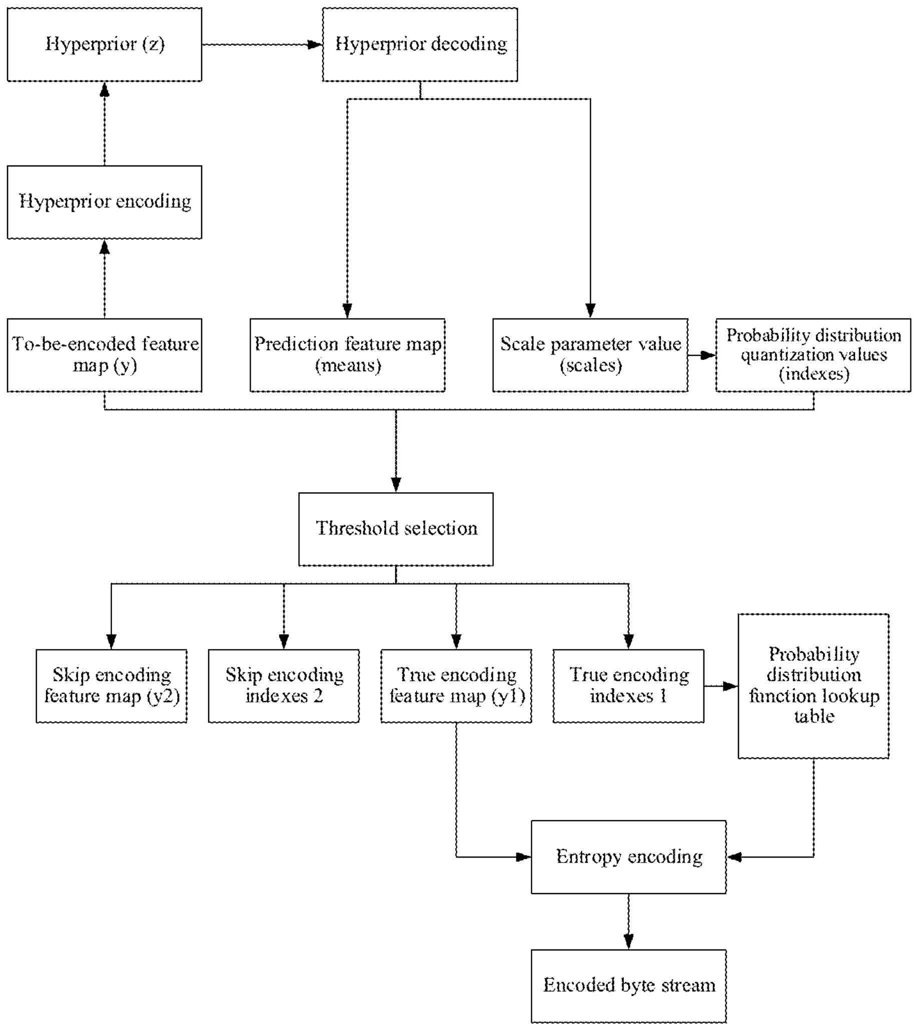
FIG. 8 is a schematic flowchart of an encoding procedure of a first device according to some embodiments.

For how to transmit the feature maps, second-stage compression, for example, the entropy encoding module, may be introduced. Referring to FIG. 7, in the related art, first, hyperprior encoding and hyperprior decoding are performed on a to-be-encoded feature map, to obtain a scale value corresponding to each feature element, then the scale value is quantized into an index, and finally, a probability distribution function is obtained by looking up a mapping relationship table by using the index, thereby implementing information compression on the to-be-encoded feature map. In this process, since there are many feature elements in the to-be-encoded feature map, if some unimportant feature elements are skipped without selecting, arithmetic coding may consume long calculation time. Based on this, in some embodiments, during implementation, an amount of actual encoding may be adjusted according to actual needs, to greatly accelerate the entropy encoding stage and push a real-time implementation of the AI video encoding and decoding algorithm without affecting encoding and decoding quality. When encoding, according to characteristics of the index, only a more important part is encoded, and when 80% to 95% calculation is skipped, accuracy of a model can still be kept without being reduced, thereby greatly reducing time consumption of encoding in the entropy encoding stage. When decoding, a feature map of an important part is obtained by decoding the byte stream, and a feature map of an unimportant part is replaced with a prediction feature map obtained through hyperprior decoding, to obtain a true decoding feature map y_hat used in a subsequent decoding procedure. The operations are described in detail as follows:

Referring to FIG. 8, an encoding procedure of the encoder side is first described.

The feature map y obtained from the encoding and decoding model is the to-be-encoded feature map. The to-be-encoded feature map may be encoded to obtain a hyperprior z (for example, auxiliary encoding information)

by using the hyperprior encoding module, and the hyperprior z is also transmitted to the decoder side in a manner. On the encoder side, after the hyperprior z is obtained, hyperprior decoding may be further performed on z, to obtain a prediction feature map means and a scale parameter value scales corresponding to the to-be-encoded feature map y. Means and scales may be understood as estimation for a probability distribution of y, where each value in means is a mean of a probability distribution of each feature element in the feature map y, and scales is a variance of the probability distribution of each feature element in the feature map y. Means and scales help to perform compression with a higher compression rate in a subsequent entropy encoding stage. The scale parameter value scales obtained through hyperprior decoding is first quantized by using the foregoing formula (3) to obtain the scale parameter quantization value indexes.

For the to-be-encoded feature map y and the scale parameter quantization value indexes, which are both feature maps of hxwxc, a threshold parameter th of indexes is set, and a value range of th is 0 to 255. For a position (i, j, k) whose index value exceeds th, a to-be-encoded feature map $y_{i,j,k}$ at the position and a scale parameter quantization value $index_{i,j,k}$ are reserved, thereby forming a true encoding feature map y 1 and a true encoding indexes 1, and for a position whose index value is less than or equal to th, a skip encoding feature map y 2 and a skip encoding indexes 2 are formed. A dimension of the true encoding indexes 1 is the same as that of y 1, and a dimension of the skip encoding indexes 2 is the same as that of y 2. In other words, the true encoding feature map y 1 records a feature element obtained through selection, the true encoding indexes 1 records a scale parameter quantization value corresponding to each feature element obtained through selection, the skip encoding feature map y 2 records an unselected feature element, and the skip encoding indexes 2 records a scale parameter quantization value corresponding to each unselected feature element.

Since a large amount of redundant information exists between video frames, most positions can be predicted more accurately, and an index value of a position with a more accurate prediction is small, so that skip may be performed. Different thresholds th are selected, and index values of different ratios may be skipped, so that different degrees of acceleration effect may be achieved. Definitely, different thresholds th may also affect a final reconstruction effect, and may be balanced. In some embodiments, when a skip ratio is between 80% and 95%, the acceleration policy does not have a significant impact on the reconstruction effect. An actual threshold may be properly adjusted according to needs.

The entropy encoding module first constructs a mapping relationship table between a scale parameter quantization value and a scale parameter value by using the foregoing Formula (1), and uses the mapping relationship table as a probability distribution function lookup table. For a predicted scale parameter value scales, each element of the scale parameter value scales is in one-to-one correspondence with a value in y. For each scale, a scale parameter quantization value index may be obtained according to the foregoing Formula (2) and Formula (3), and a corresponding scale_q value may be searched from the mapping relationship table by using the index. Since hyperprior encoding is introduced to obtain a prediction feature map means, in the encoding process, a feature element in the feature map may be converted into a probability distribution with a mean of 0 by using the prediction feature map means. Therefore, scale_q may be directly used as the probability distribution function for arithmetic coding, so that y may be compressed into a byte stream as few as possible, thereby facilitating subsequent transmission.

Figure 9:
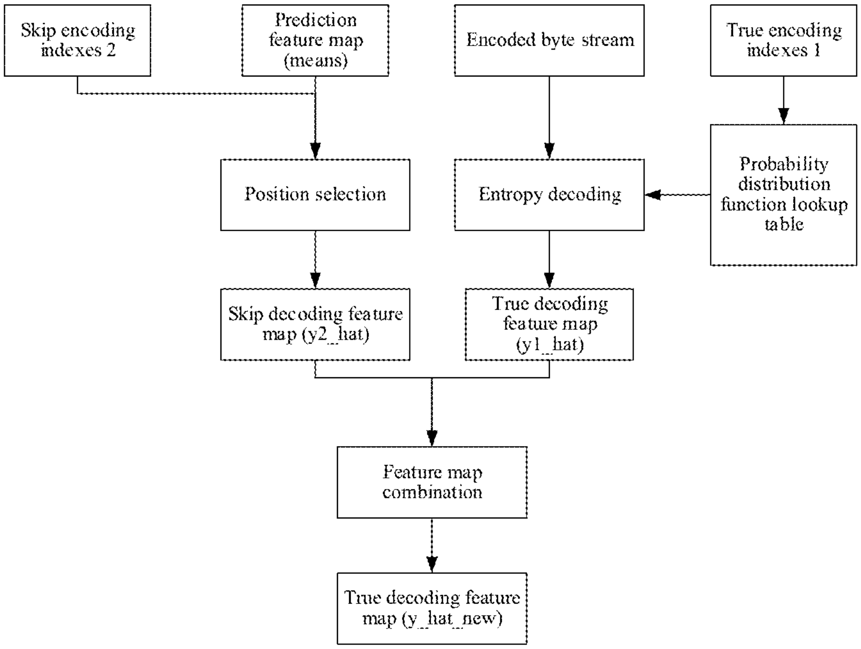
FIG. 9 is a schematic flowchart of a decoding procedure of a first device according to some embodiments.

Referring to FIG. 9, a decoding procedure of the encoder side is described next.

The decoding module may obtain reconstructed data by decoding complete y_hat. However, in the encoding process, only some elements of the feature map y are encoded as the byte stream for transmission. Therefore, decoding can only decode a part of y. For another part that is not encoded as the byte stream, a value at a corresponding position in the prediction feature map means obtained through hyperprior decoding may be replaced. This not only ensures consistency of the encoding stage and the decoding stage, but may also ensure that a true decoding feature map y_hat_new used in decoding is capable of reconstructing to obtain reconstructed data of equivalent quality. For details, refer to Formula (4).

$$\text{y\_hat\_new}_{i,j,k} = \begin{cases} \text{y1\_hat}_{i,j,k}, & \text{indexes}_{i,j,k} > th \\ \text{means}_{i,j,k}, & \text{indexes}_{i,j,k} <= th \end{cases} \quad \text{Formula (4)}$$

Corresponding to entropy encoding, in the entropy decoding stage, a corresponding y1_i_hat value may be obtained by decoding an encoded byte stream one by one according to each index_i value in the obtained true encoding indexes 1, thereby forming a true decoding feature map y1_hat, for example, a first row part in Formula (4).

For the skip encoding indexes 2 already obtained in the encoding process, all element positions (i, j, k) corresponding to the indexes 2 are positions of feature elements on which entropy encoding is not performed. Values of these feature elements in the feature map restored by decoding are not replaced with values in the original skip encoding feature map y 2, but are replaced with values at corresponding positions in the prediction feature map means. Values in the prediction feature map means for replacing feature element positions (i, j, k) corresponding to the indexes 2 are replacement elements corresponding to the feature elements on which entropy encoding is not performed, thereby constructing a skip decoding feature map y2_hat, for example, a second row part in Formula (4).

For y1_hat obtained through decoding and y2_hat obtained through construction, two feature maps are combined (for example, a method of obtaining y_hat_new according to Formula (4)), to obtain the true decoding feature map y_hat_new. The decoding module shown in FIG. 6 is performed on the feature map, to obtain reconstructed data.

Figure 10:
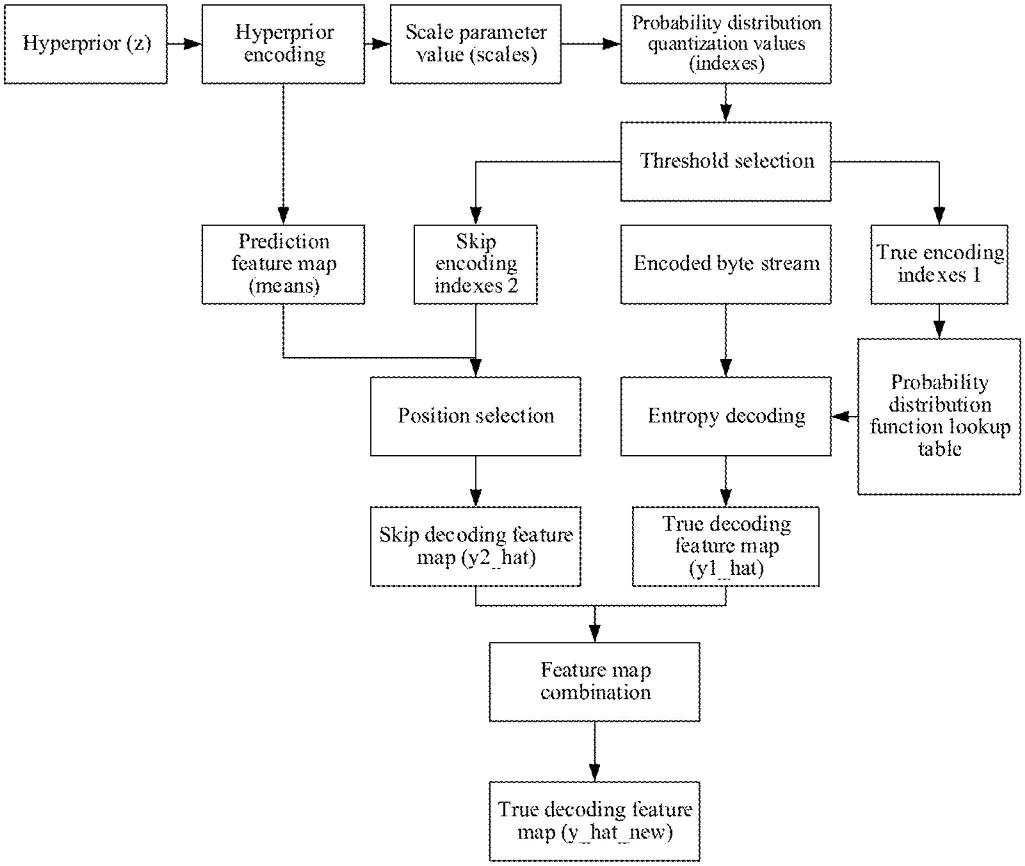
FIG. 10 is a schematic flowchart of a decoding procedure of a first device according to some embodiments.

Referring to FIG. 10, a decoding procedure of the decoder side is described next.

In the decoding procedure of the decoder side, hyperprior decoding is first performed on a hyperprior z, to obtain a prediction feature map means and a scale parameter value scales that correspond to a to-be-encoded feature map y. The scale parameter value scales obtained from the hyperprior decoding first uses the foregoing Formula (3) to calculate indexes, and obtains a threshold parameter th of indexes. A value range of th may be 0 to 255. A position (i, j, k) whose index value exceeds th is selected, to form a true encoding indexes 1. For a position whose index value is less than or equal to th, a skip encoding indexes 2 is formed. According to the true encoding indexes 1, the mapping relationship table is searched to obtain the probability distribution function for entropy decoding, and then the encoded byte stream is decoded one by one to obtain a corresponding y1_i_hat value, to construct the true decoding feature map y1_hat. A position (i, j, k) whose index value does not exceed th is selected, to form the skip encoding indexes 2. All element positions (i, j, k) corresponding to indexes 2 are positions of feature elements on which entropy encoding is not performed. Values of these feature elements in the feature map restored by decoding are not replaced with values in the original skip encoding feature map y 2, but are replaced with values at corresponding positions in the prediction feature map means. Values in the prediction feature map means for replacing feature element positions (i, j, k) corresponding to the indexes 2 are replacement elements corresponding to the feature elements on which entropy encoding is not performed. The skip decoding feature map y2_hat may be constructed according to these replacement elements. For y1_hat obtained through decoding and y2_hat obtained through construction, two feature maps are combined (for example, a method of obtaining y_hat_new according to Formula (4)), to obtain the true decoding feature map y_hat_new. In other words, for a feature element whose scale parameter quantization value exceeds a preset threshold th in the feature map y, a value at a corresponding position in the true decoding feature map y_hat_new is obtained through decoding from the encoded byte stream. For a feature element whose scale parameter quantization value does not exceed the preset threshold th in the feature map y, a replacement element is used at a corresponding position in the true decoding feature map y_hat_new, and the replacement element is a value at a position the same as that of the feature element in the prediction feature map means.

Further, the decoder side performs the decoding module shown in FIG. 6 on the feature map, to obtain reconstructed data.

Figure 11:
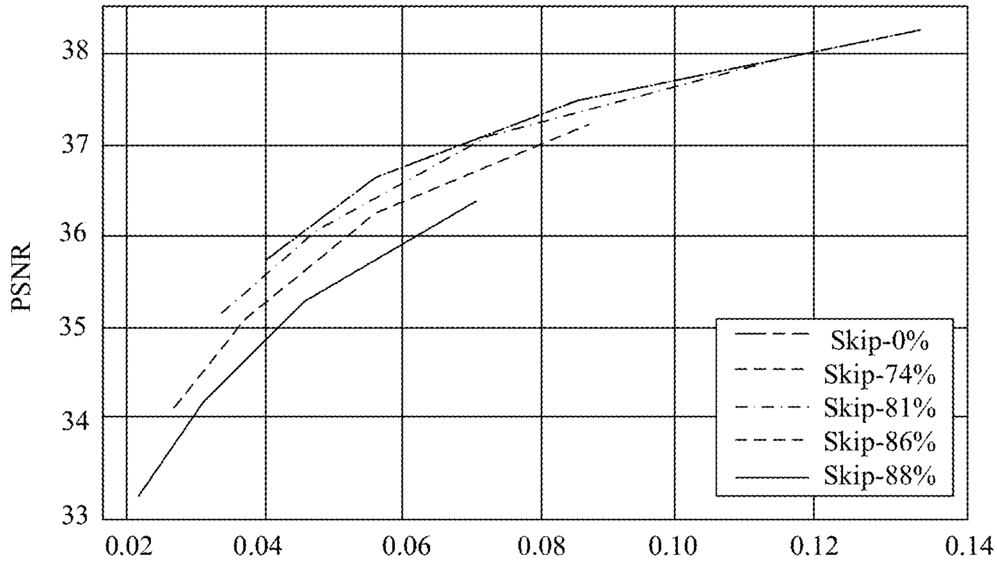
FIG. 11 is a schematic diagram of comparison results for different thresholds according to some embodiments.

The data encoding method and the data decoding method provided in some embodiments have strong applicability, does not rely on a hardware environment, and can process various types of video encoding and decoding tasks. For the AI video encoding and decoding algorithm that performs entropy encoding compression by using arithmetic coding, the present disclosure can effectively reduce a calculation amount of entropy encoding of the algorithm, thereby improving an encoding and decoding speed, and significantly contributing to real-time implementation of the AI video encoding and decoding. In addition, when an estimated value is used to replace a true value, occurrence of some glitches can usually be avoided, thereby improving smoothness of the reconstructed data. In the present disclosure, the AI video encoding and decoding algorithm is selected for experimental comparison, and a comparison between a reduction ratio of calculation amount of the algorithm after a policy of the present disclosure is used and an impact caused on a final result of the algorithm is provided. In actual use, different thresholds may be selected according to needs, to achieve balance between a speed and an index. The comparison results are shown in FIG. 11, where different curves represent results of different thresholds, skip-0% is a result of not performing skip acceleration, and skip-74%, skip-81%, skip-86%, and skip-88% are respectively effects on arithmetic results caused by reducing a calculation amount of arithmetic coding in different proportions at different thresholds. When skip-74% and the accuracy is basically unchanged, a speed of the arithmetic coding stage may be improved by 5 times, which is very appreciable.

Operations in flowcharts involved in the foregoing embodiments are displayed in sequence based on indication of arrows, but the operations are not necessarily performed in sequence based on a sequence indicated by the arrows. Unless otherwise explicitly specified in this specification, the operations are performed without any strict sequence limit, and may be performed in other sequences. In addition, at least some operations in the flowcharts involved in the foregoing embodiments may include a plurality of operations or a plurality of stages, and these operations or stages are not necessarily performed at a same moment, but may be performed at different moments. The operations or stages are not necessarily performed in sequence, but may be performed by turn or alternately with other operations or at least some operations or stages in other operations.

Based on the same invention concept, some embodiments further provides a data encoding apparatus for implementing the foregoing data encoding method and a data decoding apparatus for implementing the foregoing data decoding method. The implementation solution for solving the problem provided by this apparatus is similar to the implementation solution recorded in the foregoing method. Therefore, for the limitations in one or more embodiments of the data encoding apparatus and the data decoding apparatus provided below, reference may be made to the foregoing limitations for the data encoding method and the data decoding method, and the description is not repeated herein again.

Figure 12:
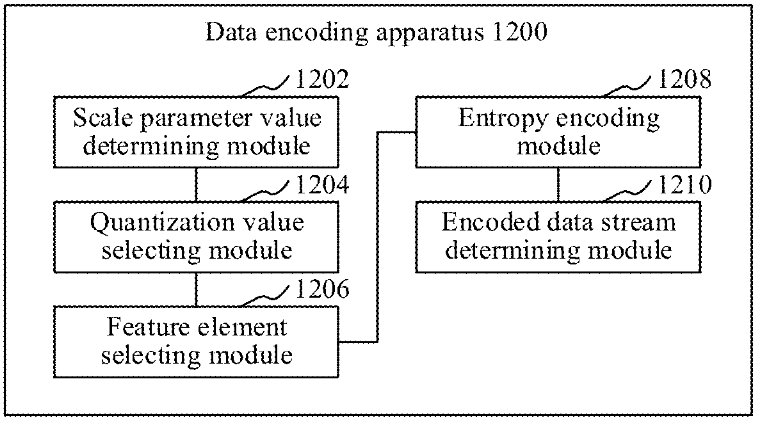
FIG. 12 is a structural block diagram of a data encoding apparatus according to some embodiments.

In some embodiments, as shown in FIG. 12, a data encoding apparatus 1200 is provided. The apparatus includes:

- a scale parameter value determining module 1202, configured to obtain auxiliary encoding information of feature data, and determine, according to the auxiliary encoding information, a scale parameter value corresponding to each feature element included in the feature data;
- a quantization value selecting module 1204, configured to: respectively perform quantization processing on each scale parameter value, to obtain a scale parameter quantization value corresponding to each scale parameter value; and select some scale parameter quantization values from the scale parameter quantization values according to a preset selecting condition, a selected scale parameter quantization value being greater than an unselected scale parameter quantization value;
- a feature element selecting module 1206, configured to: extract, from a plurality of feature elements included in the feature data, a feature element corresponding to each scale parameter quantization value obtained through selection;
- an entropy encoding module 1208, configured to: perform, for each feature element obtained through extraction, entropy encoding on the feature element based on the scale parameter quantization value corresponding to the feature element, to obtain encoded data corresponding to the feature element; and
- an encoded data stream determining module 1210, configured to determine an encoded data stream of the feature data according to the encoded data.

According to the foregoing data encoding apparatus, in the entropy encoding process, a large scale parameter quantization value may be selected according to the preset selecting condition, the feature element is selected according to a selected scale parameter quantization value, entropy encoding is performed on only the selected feature element, and the entropy encoding process of the unselected feature element is skipped. Therefore, the quantity of feature elements on which entropy encoding may be performed can be significantly reduced, thereby greatly reducing complexity of entropy encoding, and significantly improving data encoding efficiency.

In some embodiments, the preset selecting condition is that the scale parameter quantization value is used to exceed a preset quantization threshold. The quantization value selecting module 1204 is further configured to: respectively compare each scale parameter quantization value with the preset quantization threshold, to obtain a comparison result corresponding to each scale parameter quantization value; and select, from the scale parameter quantization values, a scale parameter quantization value whose corresponding comparison result indicates that the scale parameter quantization value exceeds the preset quantization threshold, to obtain some scale parameter quantization values.

In some embodiments, the feature element selecting module 1206 is further configured to: obtain motion estimation data of a data frame to which the feature data belongs, and determine, according to the motion estimation data, a motion estimation value corresponding to each scale parameter quantization value in the some scale parameter quantization values, the motion estimation value matching a position of the feature element corresponding to the corresponding scale parameter quantization value; select, from the some scale parameter quantization values, a scale parameter quantization value whose corresponding motion estimation value is greater than a motion estimation threshold; and extract, from the plurality of feature elements included in the feature data, a feature element corresponding to each selected scale parameter quantization value.

In some embodiments, each scale parameter value is a floating point number, and each scale parameter quantization value is an integer.

In some embodiments, the quantization value selecting module 1204 is further configured to: determine a quantization stepsize, the quantization stepsize being positively correlated with a difference between a maximum value and a minimum value of the scale parameter value, and the quantization stepsize being negatively correlated with a maximum quantization level set for quantization processing; respectively determine a difference between each scale parameter value and the minimum value; and respectively perform a rounding operation on the quantization stepsize according to the difference corresponding to each scale parameter value, to obtain the scale parameter quantization value corresponding to each scale parameter value.

In some embodiments, the feature data is a feature map; and the foregoing data encoding apparatus further includes: an additional encoding module, configured to: determine, from the plurality of feature elements included in the feature map, a feature element corresponding to each unselected scale parameter quantization value; perform, according to a position of the feature element corresponding to each unselected scale parameter quantization value in the feature map, region division on the feature element corresponding to each unselected scale parameter quantization value, to obtain a plurality of feature element regions; select, for each of the plurality of feature element regions, at least one feature element located at a central position of the feature element region as a region representative element; and perform entropy encoding on a representative feature element based on a scale parameter quantization value of the representative feature element, to obtain additional encoded data of the feature data.

In some embodiments, the scale parameter value determining module 1202 is further configured to: obtain the feature data, and perform hyperprior encoding on the feature data for reducing a feature dimension, to obtain the auxiliary encoding information of the feature data; and predict, by using the auxiliary encoding information, a probability distribution parameter value of each feature element included in the feature data, to obtain the scale parameter value corresponding to each feature element.

In some embodiments, the feature data is obtained by pre-encoding original data of a current data frame; and the foregoing data encoding apparatus further includes: an original data determining module, configured to: obtain an encoded data stream of a previous data frame, and reconstruct the previous data frame based on the encoded data stream of the previous data frame; perform motion estimation on the current data frame based on the reconstructed previous data frame, to obtain motion estimation data of the current data frame; perform residual compensation estimation on the current data frame based on the motion estimation data, to obtain residual compensation data of the current data frame; and use the motion estimation data and the residual compensation data as original data of the current data frame.

In some embodiments, the original data determining module is further configured to: perform entropy decoding on the encoded data stream of the previous data frame based on a scale parameter quantization value selected in a process of encoding feature data of the previous data frame, to obtain a corresponding feature element; determine a replacement element at a position of a feature element that forms feature data of the previous data frame and on which entropy encoding is not performed; combine the feature element obtained through entropy decoding and the replacement element, to obtain feature data restored for the previous data frame; and perform data reconstruction based on the feature data restored for the previous data frame, to obtain a reconstructed previous data frame.

Figure 13:
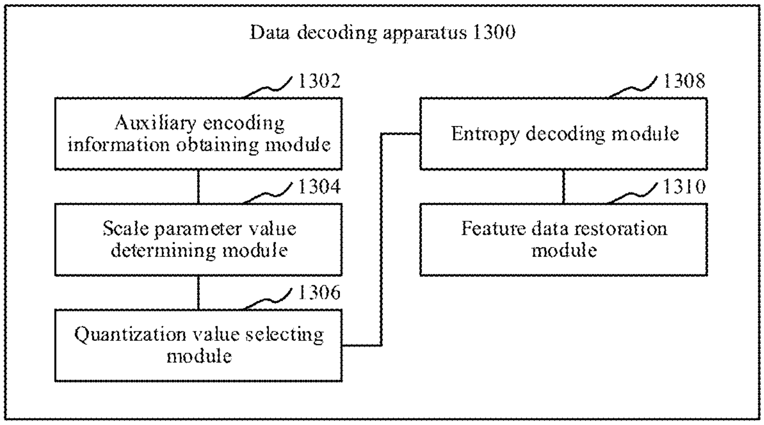
FIG. 13 is a structural block diagram of a data decoding apparatus according to some embodiments.

In some embodiments, as shown in FIG. 13, a data decoding apparatus 1300 is provided. The apparatus includes:

- an auxiliary encoding information obtaining module 1302, configured to obtain auxiliary encoding information corresponding to an encoded data stream, the encoded data stream being obtained by encoding some feature elements of feature data according to the auxiliary encoding information;
- a scale parameter value determining module 1304, configured to determine, according to the auxiliary encoding information, a scale parameter value corresponding to each feature element included in the feature data;
- a quantization value selecting module 1306, configured to: respectively perform quantization processing on each scale parameter value, to obtain a scale parameter quantization value corresponding to each scale parameter value; and select some scale parameter quantization values from the scale parameter quantization values according to a preset selecting condition, a selected scale parameter quantization value being greater than an unselected scale parameter quantization value;
- an entropy decoding module 1308, configured to perform entropy decoding on the encoded data stream based on the selected scale parameter quantization value, to obtain a corresponding feature element; and determine, according to the unselected scale parameter quantization value, a position of a feature element that forms the feature data and on which entropy encoding is not performed, and determining a replacement element at the position of the feature element on which entropy encoding is not performed; and a feature data restoration module 1310, configured to combine the feature element obtained through entropy decoding and the replacement element, to obtain restored feature data.

According to the foregoing data decoding apparatus, in the decoding process, because a large scale parameter quantization value may be selected, entropy decoding is performed only based on the selected scale parameter quantization value, so that entropy decoding may be performed on only some feature elements, thereby greatly reducing complexity of entropy encoding and significantly improving data decoding efficiency. In addition, because a selecting process is selecting the scale parameter quantization value obtained through quantization processing according to the preset selecting condition, and the scale parameter value is discretized in the quantization processing process, so that a probability that the selected scale parameter quantization value is consistent with the scale parameter quantization value selected in the encoding process increases, thereby improving accuracy of feature data restored by decoding.

In some embodiments, the entropy decoding module is further configured to: obtain motion estimation data reconstructed from a data frame to which the feature data belongs, and determine, according to the motion estimation data, a motion estimation value corresponding to each scale parameter quantization value in the some scale parameter quantization values, the motion estimation value matching a position of a feature element corresponding to the corresponding scale parameter quantization value; select, from the some scale parameter quantization values, a scale parameter quantization value whose corresponding motion estimation value is greater than a motion estimation threshold; and perform entropy decoding on the encoded data stream by using the selected scale parameter quantization value, to obtain the corresponding feature element.

In some embodiments, each scale parameter value is a floating point number, and each scale parameter quantization value is an integer.

In some embodiments, the quantization value selecting module is configured to: determine a quantization stepsize, the quantization stepsize being positively correlated with a difference between a maximum value and a minimum value of the scale parameter value, and the quantization stepsize being negatively correlated with a quantization level set for quantization processing; respectively determine a difference between each scale parameter value and the minimum value; and respectively perform a rounding operation on the quantization stepsize according to the difference corresponding to each scale parameter value, to obtain the scale parameter quantization value corresponding to each scale parameter value.

In some embodiments, the entropy decoding module is further configured to: obtain a prediction feature value corresponding to each feature element, the prediction feature value being obtained by predicting a probability distribution parameter value of a corresponding feature element by using the auxiliary encoding information; and determine, for a position of each feature element on which entropy encoding is not performed, a prediction feature value whose position matches the position from the prediction feature values, and determining a replacement element for the position of the feature element according to the determined prediction feature value.

In some embodiments, the entropy decoding module is further configured to: obtain additional encoded data of the feature map from the encoded data stream, and perform entropy decoding on the additional encoded data, to obtain a corresponding region representative element; perform, in the feature map, region division based on a position of a feature element on which entropy encoding is not performed; and respectively determine, for each divided region, a region representative element whose position is in the region as a replacement element at a position of each feature element on which entropy encoding is not performed in the region.

The modules in the foregoing data encoding apparatus and data decoding apparatus may be implemented entirely or partially by software, hardware, or a combination thereof. The foregoing modules may be built in or independent of a processor of a computer device in a hardware form, or may be stored in a memory of a computer device in a software form, so that the processor invokes and performs an operation corresponding to each of the foregoing modules.

In some embodiments, a computer device is provided. The computer device may be a server, and an internal structure diagram thereof may be shown in FIG. 14. The computer device includes a processor, a memory, an input/output (I/O for short) interface, and a communication interface. The processor, the memory, and the input/output interface are connected through a system bus, and the communication interface is connected to the system bus through the input/output interface. The processor of the computer device is configured to provide computing and control capabilities. The memory of the computer device includes a non-volatile storage medium and an internal memory. The non-volatile storage medium stores an operating system, computer-readable instructions, and a database. The internal memory provides an environment for running of the operating system and the computer-readable instructions in the non-volatile storage medium. The database of the computer device is configured to store the encoded data stream or reconstructed data obtained by decoding. The input/output interface of the computer device is configured to exchange information between the processor and an external device. The communication interface of the computer device is configured to communicate with an external terminal through a network connection. The computer-readable instructions are executed by the processor to implement a data encoding method or a data decoding method.

In some embodiments, a computer device is provided. The computer device may be a terminal, and an internal structure diagram thereof may be shown in FIG. 15. The computer device includes a processor, a memory, an input/output interface, a communication interface, a display unit, and an input apparatus. The processor, the memory, and the input/output interface are connected through a system bus, and the communication interface, the display unit, and the input apparatus are connected to the system bus through the input/output interface. The processor of the computer device is configured to provide computing and control capabilities. The memory of the computer device includes a non-volatile storage medium and an internal memory. The non-volatile storage medium stores an operating system and computer-readable instructions. The internal memory provides an environment for running of the operating system and the computer-readable instructions in the non-volatile storage medium. The input/output interface of the computer device is configured to exchange information between the processor and an external device. The communication interface of the computer device is configured to communicate with an external terminal in a wired or a wireless manner, and the wireless manner can be implemented by using WIFI, a mobile cellular network, a near field communication (NFC), or other technologies. The computer-readable instructions are executed by the processor to implement a data encoding method or a data decoding method. The display unit of the computer device is configured to form a visually visible picture, and may be a display screen, a projection apparatus, or a virtual reality imaging apparatus. The display screen may be a liquid crystal display screen or an electronic ink display screen. The input apparatus of the computer device may be a touch layer covering the display screen, or may be a key, a trackball, or a touch pad arranged on a housing of the computer device, or may be an external keyboard, a touch pad, a mouse, or the like.

Figure 14:
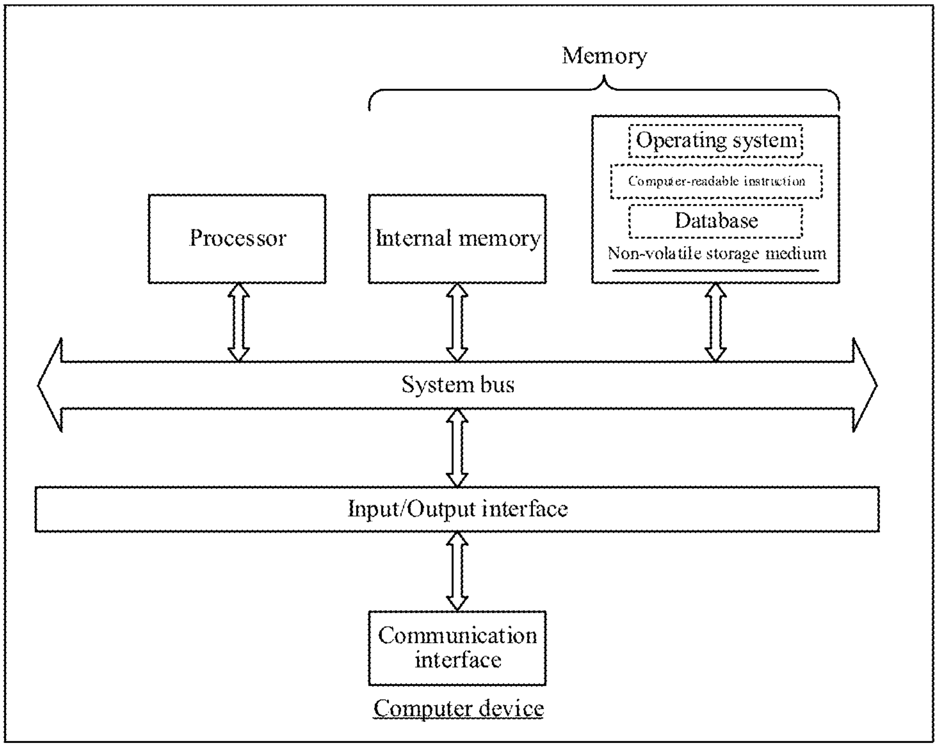
FIG. 14 is a diagram of an internal structure of a computer device according to some embodiments.
Figure 15:
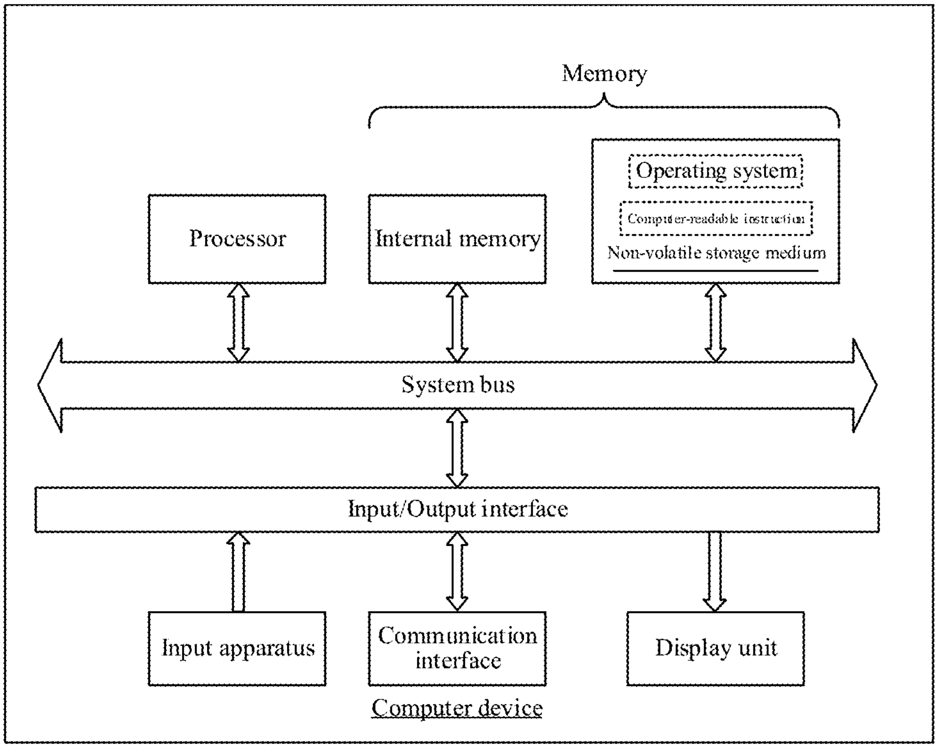
FIG. 15 is a diagram of an internal structure of a computer device according to some embodiments.

A person skilled in the art may understand that, the structures shown in FIG. 14 and FIG. 15 are only a block diagram of a part of a structure related to a solution and does not limit the computer device to which the solution is applied. Specifically, the computer device may include more or fewer components than those in the drawings, or some components are combined, or a different component arrangement is used.

In some embodiments, a computer device is provided, including a memory and a processor, the memory having computer-readable instructions stored therein, the processor, when executing the computer-readable instructions, implementing the operations of the data encoding method or the data decoding method according to any one of the foregoing embodiments.

In some embodiments, a computer-readable storage medium is provided, having computer-readable instructions stored therein, the computer-readable instructions, when executed by a processor, implementing the operations of the data encoding method or the data decoding method according to any one of the foregoing embodiments.

In some embodiments, a computer program product is provided, having computer-readable instructions stored therein, the computer-readable instructions, when executed by a processor, implementing the operations of the data encoding method or the data decoding method according to any one of the foregoing embodiments.

The user information (including, but not limited to, user equipment information, user personal information, and the like) and the data (including, but not limited to, data for analysis, stored data, displayed data, and the like) involved in this application all are information and data authorized by the user or fully authorized by each party, and the acquisition, use, and processing of relevant data need to comply with relevant laws and regulations of relevant countries and regions.

A person of ordinary skill in the art may understand that all or some of the procedures of the methods of the foregoing embodiments may be implemented by using computer-readable instructions instructing relevant hardware. The computer-readable instructions may be stored in a non-volatile computer-readable storage medium. When the computer-readable instructions are executed, the procedures of some embodiments of the foregoing methods may be included. Any reference to a memory, a database, or another medium used in some embodiments provided in this application may include at least one of a non-volatile memory and a volatile memory. The non-volatile memory may include a read-only memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a graphene memory, and the like. The volatile memory may include a random access memory (RAM) or an external cache. For the purpose of description instead of limitation, the RAM may be in a plurality of forms, such as a static random access memory (SRAM) or a dynamic random access memory (DRAM). The database involved in some embodiments provided in this application may include at least one of a relational database and a non-relational database. The non-relational database may include a blockchain-based distributed database, but is not limited thereto. The processor involved in some embodiments provided in this application may be a general-purpose processor, a central processing unit, a graphics processing unit, a digital signal processor, a programmable logic device, a quantum computing-based data processing logic device, and are not limited thereto.

The technical features in the foregoing embodiments may be randomly combined. For concise description, not all possible combinations of the technical features in some embodiments are described. However, provided that combinations of the technical features do not conflict with each other, the combinations of the technical features are considered as falling within the scope recorded in this specification.

According to some embodiments, each module or unit may exist respectively or be combined into one or more units. Some units may be further split into multiple smaller function subunits, thereby implementing the same operations without affecting the technical effects of some embodiments. The units are divided based on logical functions. In actual applications, a function of one unit may be realized by multiple units, or functions of multiple units may be realized by one unit. In some embodiments, the apparatus may further include other units. These functions may also be realized cooperatively by the other units, and may be realized cooperatively by multiple units.

A person skilled in the art would understand that these "modules" could be implemented by hardware logic, a processor or processors executing computer software code, or a combination of both. The "modules" may also be implemented in software stored in a memory of a computer or a non-transitory computer-readable medium, where the instructions of each module are executable by a processor to thereby cause the processor to perform the respective operations of the corresponding module.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A data encoding method, performed by a computer device, comprising:

obtaining auxiliary encoding information of feature data;

determining, based on the auxiliary encoding information, scale parameter values corresponding to feature elements in the feature data;

performing quantization processing on the scale parameter values;

obtaining scale parameter quantization values corresponding to the scale parameter values;

selecting, based on a preset selecting condition, a subset of the scale parameter quantization values from the scale parameter quantization values, a selected scale parameter quantization value being greater than an unselected scale parameter quantization value;

extracting, from the feature elements in the feature data, a first subset of the feature elements corresponding to the selected subset of the scale parameter quantization values;

performing entropy encoding on the first subset of the feature elements based on the selected subset of the scale parameter quantization values;

obtaining encoded data corresponding to the first subset of the feature element; and determining an encoded data stream of the feature data based on the encoded data.

2. The method according to claim 1, wherein the preset selecting condition comprises a condition of the selected subset of the scale parameter quantization values exceeding a preset quantization threshold; and wherein the selecting, based on a preset selecting condition, a subset of the scale parameter quantization values from the scale parameter quantization values comprises:

comparing the scale parameter quantization values with the preset quantization threshold;

obtaining comparison results corresponding to the scale parameter quantization values;

selecting, from the scale parameter quantization values, a subset of the scale parameter quantization values based on the comparison results; and obtain the selected subset of the scale parameter quantization values.

3. The method according to claim 1, wherein the extracting, from the feature elements in the feature data, a first subset of the feature elements comprises:

obtaining motion estimation data of a data frame to which the feature data belongs;

determining, based on the motion estimation data, motion estimation values corresponding to the selected subset of the scale parameter quantization values, the motion estimation value matching a position of the first subset of the feature elements;

selecting, from the selected subset of scale parameter quantization values, at least one scale parameter quantization values whose corresponding motion estimation value is greater than a motion estimation threshold; and extracting, from the plurality of feature elements in the feature data, feature element corresponding to the at least one scale parameter quantization value whose corresponding motion estimation value is greater than a motion estimation threshold.

4. The method according to claim 1, wherein each of the scale parameter values is a floating point number, and each of scale parameter quantization values is an integer.

5. The method according to claim 1, wherein the performing quantization processing on the scale parameter values comprises:

determining a quantization stepsize, the quantization stepsize being positively correlated with a difference between a maximum value and a minimum value of the scale parameter values, and the quantization stepsize being negatively correlated with a maximum quantization level set for quantization processing;

determining differences between the scale parameter values and the minimum value; and performing a rounding operation on the quantization stepsize based on the differences; and obtaining scale parameter quantization values corresponding to scale parameter values.

6. The method according to claim 1, wherein the feature data is a feature map; and the method further comprises:

determining, from the feature elements in the feature map, a second subset of the feature elements corresponding to an unselected subset of scale parameter quantization values;

performing region division on the second subset of the feature elements, based on positions of the second subset of the feature elements;

obtaining a plurality of feature element regions;

selecting, for each of the plurality of feature element regions, at least one representative feature element located at a central position of the each of the plurality of the feature element region as a region representative element; and performing entropy encoding on the at least one representative feature element based on its corresponding scale parameter quantization values; and obtaining additional encoded data of the feature data.

7. The method according to claim 1, wherein the obtaining auxiliary encoding information of feature data; determining, based on the auxiliary encoding information, scale parameter values corresponding to feature elements in the feature data comprises:

obtaining the feature data;

performing hyperprior encoding on the feature data for reducing a feature dimension;

obtaining the auxiliary encoding information of the feature data;

predicting, based on the auxiliary encoding information, probability distribution parameter values of the feature elements; and obtaining the scale parameter values corresponding to the feature elements.

8. The method according to claim 1, wherein the feature data is obtained based on pre-encoding original data of a current data frame; and the method further comprises:

obtaining an encoded data stream of a previous data frame;

reconstructing the previous data frame based on the encoded data stream of the previous data frame;

performing motion estimation on the current data frame based on a reconstructed previous data frame;

obtaining motion estimation data of the current data frame;

performing residual compensation estimation on the current data frame based on the motion estimation data;

obtaining residual compensation data of the current data frame; and determining the motion estimation data and the residual compensation data as the original data of the current data frame.

9. The method according to claim 8, wherein the reconstructing the previous data frame based on the encoded data stream of the previous data frame comprises:

performing entropy decoding on the encoded data stream of the previous data frame based on scale parameter quantization values that are selected for encoding feature data of the previous data frame and obtaining feature elements;

determining positions of feature elements in the feature data of the previous data frame on which entropy encoding is not performed;

determining replacement elements for the positions of feature elements on which entropy encoding is not performed;

combining the feature elements obtained through entropy decoding and the replacement elements, and obtaining restored feature data for the previous data frame; and performing data reconstruction based on the restored feature data and obtaining the reconstructed previous data frame.

10. A data decoding method, performed by a computer device, comprising:

obtaining auxiliary encoding information corresponding to an encoded data stream, the encoded data stream being obtained by encoding a subject of feature elements selected from feature data based on the auxiliary encoding information;

determining, based on the auxiliary encoding information, scale parameter values corresponding to feature elements in the feature data;

performing quantization processing on scale parameter values;

obtaining scale parameter quantization values corresponding to scale parameter values;

selecting a subset of scale parameter quantization values from the scale parameter quantization values based on a preset selecting condition, a selected scale parameter quantization value being greater than an unselected scale parameter quantization value;

performing entropy decoding on the encoded data stream based on the selected subset of the scale parameter quantization values, and obtaining corresponding feature elements;

determining, based on the unselected scale parameter quantization values, positions of feature elements in the feature data on which entropy encoding is not performed;

determining replacement elements for the positions of feature elements on which entropy encoding is not performed; and combining the feature elements obtained through entropy decoding and the replacement element and obtaining restored feature data.

11. The method according to claim 10, wherein the performing entropy decoding on the encoded data stream based on the selected subject of scale parameter quantization values, and obtaining corresponding feature elements comprises:

obtaining reconstructed motion estimation data fora data frame to which the feature data belongs;

determining, based on the reconstructed motion estimation data, motion estimation values corresponding to each scale parameter quantization value in the selected subset of the scale parameter quantization values, each of the motion estimation values matching a position of a corresponding feature element;

selecting, from the selected subset of the scale parameter quantization values, at least one scale parameter quantization values whose corresponding motion estimation value is greater than a motion estimation threshold; and performing entropy decoding on the encoded data stream based on the at least one scale parameter quantization value, and obtaining the corresponding feature element.

12. The method according to claim 1, wherein each of the scale parameter values is a floating point number, and each of the scale parameter quantization values is an integer.

13. The method according to claim 12, wherein the performing quantization processing on scale parameter values comprises:

determining a quantization stepsize, the quantization stepsize being positively correlated with a difference between a maximum value and a minimum value of the scale parameter values, and the quantization stepsize being negatively correlated with a quantization level set for quantization processing;

determining differences between the scale parameter values and the minimum value; and performing a rounding operation on the quantization stepsize based on the differences; and obtaining the scale parameter quantization values corresponding to scale parameter values.

14. The method according to claim 10, wherein the determining a replacement element at the position of the feature element on which entropy encoding is not performed comprises:

obtaining prediction feature values corresponding to the feature elements in the feature data, wherein the prediction feature values are obtained based on predicting probability distribution parameter values of a corresponding feature element by using the auxiliary encoding information;

identifying, for each position of a feature element on which entropy encoding is not performed, a prediction feature value; and determining a replacement element for the position of the feature element based on the prediction feature value.

15. The method according to claim 10, wherein the feature data is a feature map; and wherein the determining a replacement element at the position of the feature element on which entropy encoding is not performed comprises:

obtaining encoded data of the feature map from the encoded data stream;

performing entropy decoding on the encoded data;

obtaining a corresponding region representative element;

performing, in the feature map, region division based on the position of the feature element on which entropy encoding is not performed; and determining, for each of the divided regions, a region representative feature element whose position is in the divided region as a replacement element for each position of a feature element on which entropy encoding was not performed in the divided region.

16. A data encoding apparatus, comprising:

at least one memory configured to store program code; and at least one processor configured to read the program code and operate as instructed by the program code, the program code comprising:

obtaining code configured to cause at least one of the at least one processor to obtain auxiliary encoding information of feature data;

determining code configured to cause at least one of the at least one processor to determine, based on the auxiliary encoding information, scale parameter values corresponding to feature elements in the feature data;

quantization code configured to cause at least one of the at least one processor to perform quantization processing on the scale parameter values;

value obtaining code configured to cause at least one of the at least one processor to obtain scale parameter quantization values corresponding to the scale parameter values;

selecting code configured to cause at least one of the at least one processor to select, based on a preset selecting condition, a subset of the scale parameter quantization values from the scale parameter quantization values, a selected scale parameter quantization value being greater than an unselected scale parameter quantization value;

extracting code configured to cause at least one of the at least one processor to extract, from the feature elements in the feature data, a first subset of the feature elements corresponding to the selected subset of the scale parameter quantization values;

encoding code configured to cause at least one of the at least one processor to perform entropy encoding on the first subset of the feature elements based on the selected subset of the scale parameter quantization values;

data obtaining code configured to cause at least one of the at least one processor to obtain encoded data corresponding to the first subset of the feature element; and stream determining code configured to cause at least one of the at least one processor to determine an encoded data stream of the feature data based on the encoded data.

17. The apparatus according to claim 16, wherein the preset selecting condition comprises a condition of the selected subset of the scale parameter quantization values exceeding a preset quantization threshold; and wherein the selecting code is further configured to cause at least one of the at least one processor to:

compare the scale parameter quantization values with the preset quantization threshold;

obtain comparison results corresponding to the scale parameter quantization values;

select, from the scale parameter quantization values, a subset of the scale parameter quantization values based on the comparison results; and obtain the selected subset of the scale parameter quantization values.

18. The apparatus according to claim 16, wherein the extracting code is further configured to cause at least one of the at least one processor to:

obtain motion estimation data of a data frame to which the feature data belongs;

determine, based on the motion estimation data, motion estimation values corresponding to the selected subset of the scale parameter quantization values, the motion estimation value matching a position of the first subset of the feature elements;

select, from the selected subset of scale parameter quantization values, at least one scale parameter quantization value whose corresponding motion estimation value is greater than a motion estimation threshold; and extract, from the plurality of feature elements in the feature data, feature elements corresponding to the at least one scale parameter quantization value whose corresponding motion estimation value is greater than a motion estimation threshold.

19. The apparatus according to claim 16, wherein each of the scale parameter values is a floating point number, and each of scale parameter quantization values is an integer.

20. The apparatus according to claim 16, wherein the quantization code is further configured to cause at least one of the at least one processor to:

determine a quantization stepsize, the quantization stepsize being positively correlated with a difference between a maximum value and a minimum value of the scale parameter values, and the quantization stepsize being negatively correlated with a maximum quantization level set for quantization processing;

determine differences between the scale parameter values and the minimum value;

perform a rounding operation on the quantization stepsize based on the differences; and obtain scale parameter quantization values corresponding to scale parameter values.

* * * * *